United States Patent
Kim et al.

(10) Patent No.: US 9,866,080 B2
(45) Date of Patent: Jan. 9, 2018

(54) COMPRESSOR, MOTOR INCLUDED THEREIN, AND METHOD FOR MANUFACTURING THE MOTOR

(71) Applicant: SAMSUNG ELECTRONICS CO., LTD., Suwon-si, Gyeonggi-do (KR)

(72) Inventors: Hong Seok Kim, Yongin-si (KR); Jong Jin Park, Suwon-si (KR); Byoung Soo Ko, Seoul (KR); Dong Woo Kang, Seoul (KR); Kang Rib Kim, Suwon-si (KR); Young Kwan Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 14/570,342

(22) Filed: Dec. 15, 2014

(65) Prior Publication Data

US 2015/0188377 A1 Jul. 2, 2015

(30) Foreign Application Priority Data

Dec. 30, 2013 (KR) .................. 10-2013-0166581
Jul. 11, 2014 (KR) .................. 10-2014-0087256

(51) Int. Cl.
*H02K 21/12* (2006.01)
*H02K 1/27* (2006.01)
(Continued)

(52) U.S. Cl.
CPC ............. *H02K 1/278* (2013.01); *F04B 35/04* (2013.01); *F04C 18/3564* (2013.01); *F04C 23/001* (2013.01); *F04C 23/008* (2013.01); *F04C 29/0085* (2013.01); *H02K 3/522* (2013.01); *H02K 15/0068* (2013.01); *H02K 29/03* (2013.01); *H02K 2203/09* (2013.01); *Y10T 29/49009* (2015.01)

(58) Field of Classification Search
CPC ........... H02K 1/276; H02K 21/16; H02K 1/24
USPC ... 310/156.01–156.84, 71, 216.001–216.137
See application file for complete search history.

(56) References Cited

U.S. PATENT DOCUMENTS

| 2003/0011272 A1* | 1/2003 | Kataoka ................. H02K 1/146 |
| | | 310/199 |
| 2008/0018190 A1* | 1/2008 | Takahata .............. H02K 1/2766 |
| | | 310/156.56 |

(Continued)

FOREIGN PATENT DOCUMENTS

KR 10-2006-0133866 12/2006

*Primary Examiner* — Thanh Lam
(74) *Attorney, Agent, or Firm* — Staas & Halsey LLP

(57) ABSTRACT

A compressor includes a motor which includes a stator assembly configured to include a stator in which a hollow is formed, a plurality of coils formed by a winding wound on the stator, and an insulator for insulating the stator from the coils, and a rotor inserted into the hollow, configured to rotate about a rotation axis. The rotor includes a plurality of poles, and a curvature radius of an outer circumference of a center part of the poles is different from a curvature radius of an outer circumference of an edge part of the poles. A method for fabricating a motor includes coupling a stator hook formed in a busbar assembly having a plurality of busbars to a hook engaging part formed in the stator assembly having the plurality of coils, and fusing a winding onto a folded plate connected to the plurality of busbars.

13 Claims, 30 Drawing Sheets

US 9,866,080 B2

Page 2

(51) Int. Cl.
F04B 35/04 (2006.01)
F04C 23/00 (2006.01)
F04C 29/00 (2006.01)
F04C 18/356 (2006.01)
H02K 29/03 (2006.01)
H02K 3/52 (2006.01)
H02K 15/00 (2006.01)

(56) References Cited

U.S. PATENT DOCUMENTS

| | | | | |
|---|---|---|---|---|
| 2011/0050022 A1* | 3/2011 | Li | ............ | H02K 1/276 |
| | | | | 310/156.46 |
| 2012/0248919 A1* | 10/2012 | Takemoto | ............ | H02K 29/12 |
| | | | | 310/156.53 |
| 2012/0262014 A1* | 10/2012 | Katou | ............ | H02K 3/522 |
| | | | | 310/71 |
| 2013/0020896 A1* | 1/2013 | Zhou | ............ | H02K 29/03 |
| | | | | 310/156.01 |

* cited by examiner (a)　　　　　　　　　　(b)

(a)

(b)

COMPRESSOR, MOTOR INCLUDED THEREIN, AND METHOD FOR MANUFACTURING THE MOTOR

CROSS-REFERENCE TO RELATED APPLICATIONS

This application claims the priority benefit of Korean Patent Application Nos. 10-2013-0166581 and 10-2014-0087256, respectively filed on Dec. 30, 2013 and Jul. 11, 2014, in the Korean Intellectual Property Office, the disclosures of each of which are incorporated herein by reference.

BACKGROUND

1. Field

The following description relates to a compressor and a motor included therein, and more particularly to a compressor including a busbar assembly for efficiently arranging windings, a compressor included in the compressor, and a method for manufacturing the motor.

2. Description of the Related Art

A compressor generally refers to a device configured to compress refrigerant evaporated by a cooling device such as a refrigerator and an air-conditioner. Specifically, the compressor may include a reciprocating compressor to compress gaseous refrigerant by a reciprocation motion of a piston contained in a cylinder, and a rotary compressor to compress gaseous refrigerant absorbed by movement of a rotor that rotates along a predetermined eccentric path within a cylinder.

In addition, the compressor may be configured to use a motor to generate a reciprocating motion of the piston or the rotation movement of the eccentric rotor.

The motor may include a stator fixed to an external support body to generate the rotating magnetic field, and a rotor configured to rotate according to a rotating magnetic field generated by the stator.

In addition, coils provided to generate the rotating magnetic field may be contained in the stator. The coils may be formed by winding teeth of the stator formed of a magnetic material with wires.

However, when the number of windings constructing each coil increases in response to the number of teeth, the number of input terminals configured to provide each coil with a current is limited to 2 or 3. For example, a 3-phase motor having 9 slots has 3 input terminals whereas it has 9 coils.

As described above, since the number of coils is different from the number of input terminals, there is a need to interconnect windings configured to construct coils having the same phase.

Conventionally, a user has to manually interconnect the windings constructing the coils having the same phase. However, the user has difficulty in efficiently arranging windings of a small-sized motor. Specifically, the windings may be wrongly interconnected due to a user's mistake, resulting in the occurrence of low reliability.

SUMMARY

Therefore, it is an aspect of the disclosure to provide a small-sized stator in which windings of coils having the same phase are interconnected.

Additional aspects of the disclosure will be set forth in part in the description which follows and, in part, will be apparent from the description, or may be learned by practice of the disclosure.

In accordance with an aspect of the disclosure, a motor may include: a stator assembly configured to include a stator in which a hollow is formed, a plurality of coils formed by a winding wound on the stator, and an insulator for insulating the stator from the coils, and a rotor inserted into the hollow, configured to rotate about a rotation axis. The rotor may include a plurality of poles, and a curvature radius of an outer circumference of a center part of the poles is different from a curvature radius of an outer circumference of an edge part of the poles.

The poles of the rotor may be divided into a first region and a second region along a circumferential direction of the rotor, and a curvature radius of an outer circumference of the first region may be larger than that of an outer circumference of the second region.

The stator may include: a ring-shaped stator body and teeth protruded from the stator body in a radial direction, wherein the teeth may include a teeth shoe protruded from the teeth in a circumferential direction, and a teeth protrusion radially protruded from the teeth.

An angle between both ends of the first region on the basis of the rotation axis may be less than an angle between both ends of the teeth shoe on the basis of the rotation axis.

An angle between both ends of the first region on the basis of the rotation axis may be larger than an angle between both ends of the teeth protrusion on the basis of the rotation axis.

The motor may further include: a busbar assembly configured to connect the plurality of coils to an external driving circuit. The busbar assembly may include a plurality of busbars having circular arc shapes having different radiuses, and a busbar housing for insulating the plurality of busbars.

The plurality of busbars may include: a busbar extending unit configured to extend the plurality of busbars to the innermost or outermost part of the busbar housing and a winding coupling unit provided at the end of the busbar extending unit, configured to be coupled to the winding.

The winding coupling unit may include a folded plate in which a coupling protrusion part is formed at a center part thereof.

The winding coupling unit may include: a winding stripper configured to electrically contact the plurality of windings, a stripper support body configured to support the winding stripper, and a winding fixing member configured to fix the plurality of windings to the winding stripper.

The busbar housing may be configured to insulate between the plurality of busbars, and may include a plurality of ring-shaped barriers having different radiuses.

The busbar housing may include a stator hook through which the busbar housing is fixed to the stator assembly and the insulator may include a hook engaging part that is provided at a position corresponding to the stator hook and is coupled to the stator hook.

The insulator may include a winding guide bar for primarily bending the plurality of windings and the busbar housing may include a winding guide groove for secondarily bending the plurality of windings.

The busbar assembly may further include a busbar housing cover configured to cover an upper part of the busbar housing.

The busbar housing may include a cover hook for fixing the busbar housing cover to a coupling position and a cover guide bar for directing the busbar housing cover to a coupling position, and the busbar housing cover may have a cover guide groove located at a position corresponding to the cover guide bar.

In accordance with an aspect of the disclosure, a method for fabricating a motor that may include a busbar assembly having a plurality of busbars and a stator assembly having a plurality of coils may include: coupling a stator hook formed in the busbar assembly to a hook engaging part formed in a stator assembly and fusing a winding onto a folded plate connected to the plurality of busbars.

The method may further include: primarily or first bending the winding connected to the plurality of coils along an outer surface of a winding guide bar formed in the stator assembly, and secondarily bending the winding along an outer surface of a winding guide groove formed in the busbar assembly.

The fusing of the winding onto the folded plate may include: pressurizing the folded plate having the winding in both directions of the folded plate, providing a first welding current to the folded plate having the winding so as to remove a coating of the winding, and providing a second welding current to the folded plate having the winding so as to fuse the winding onto the folded plate.

The first welding current and the second welding current may have pulse shapes and the first welding current may have the same magnitude and pulse-width as those of the second welding current.

The first welding current and the second welding current may have pulse shapes and the second welding current may have larger magnitude and pulse-width than those of the first welding current.

In accordance with an aspect of the disclosure, a compressor may include: a compression unit configured to compress refrigerant and a motor configured to provide rotational force to the compression unit through a rotation axis connected to the compression unit. The motor may include: a stator assembly configured to include a stator in which a hollow is formed, a plurality of coils formed by a winding wound on the stator, and an insulator for insulating the stator from the coils, a rotor inserted into the hollow, configured to rotate about a rotation axis, and a busbar assembly configured to couple the plurality of coils to an external driving circuit. The busbar assembly may include a plurality of busbars having circular arc shapes having different radiuses, and a busbar housing for insulating the plurality of busbars.

The plurality of busbars may include: a busbar extending unit configured to extend the plurality of busbars to the innermost or outermost part of the busbar housing, and a winding coupling unit provided at the end of the busbar extending unit, configured to be coupled to the winding.

The compression unit may include: a cylinder configured to form a compression space in which the refrigerant is compressed, a rolling piston connected to the rotation axis, configured to eccentrically rotate in the cylinder, and a vane protruded from an inner circumference of the cylinder toward the rotation axis, configured to divide the compression space into a compression chamber for compressing the refrigerant and a suction chamber for sucking the refrigerant.

The rolling piston may eccentrically rotate about the rotation axis, and may compress the refrigerant contained in the compression chamber.

In accordance with an aspect of the disclosure, a stator assembly may include: a stator in which a hollow is formed, a plurality of coils formed by a winding wound on the stator, and a busbar assembly to connect the plurality of coils. The busbar assembly may include a plurality of busbars having circular arc shapes having different radiuses and which are arranged in at least a partially concentric manner with respect to one another, and at least two busbars among the plurality of busbars may be connected to coils having different phases.

The busbar assembly may further include a busbar terminal including at least one wire connected to at least one terminal coupling part of a first busbar connected to a first coil having a first phase, and at least one other wire connected to at least one other terminal coupling part of a second busbar connected to a second coil having a second phase. The busbar terminal may include a terminal coupling terminal which includes a U-phase terminal, a V-phase terminal, and a W-phase terminal.

The plurality of busbars may include a busbar extending unit to extend the plurality of busbars to an inner portion of the busbar assembly or an outer portion of the busbar assembly, and a winding coupling unit provided at an end of the busbar extending unit, to be coupled to the winding.

A first busbar may form a common neutral point and may include a plurality of winding coupling units, a second busbar may forms a first phase and may include a number of winding coupling units less than the number of winding coupling units included in the first busbar, and a third busbar may form a second phase and may include a number of winding coupling units less than the number of winding coupling units included in the first busbar.

In accordance with an aspect of the disclosure, a motor may include a stator assembly including a stator in which a hollow is formed, a plurality of coils formed by a winding wound on the stator, and a busbar assembly to connect the plurality of coils, and a rotor inserted into the hollow, to rotate about a rotation axis. The busbar assembly may include a plurality of busbars having circular arc shapes having different radiuses and which are arranged in at least a partially concentric manner with respect to one another, and at least two busbars among the plurality of busbars may be connected to coils having different phases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
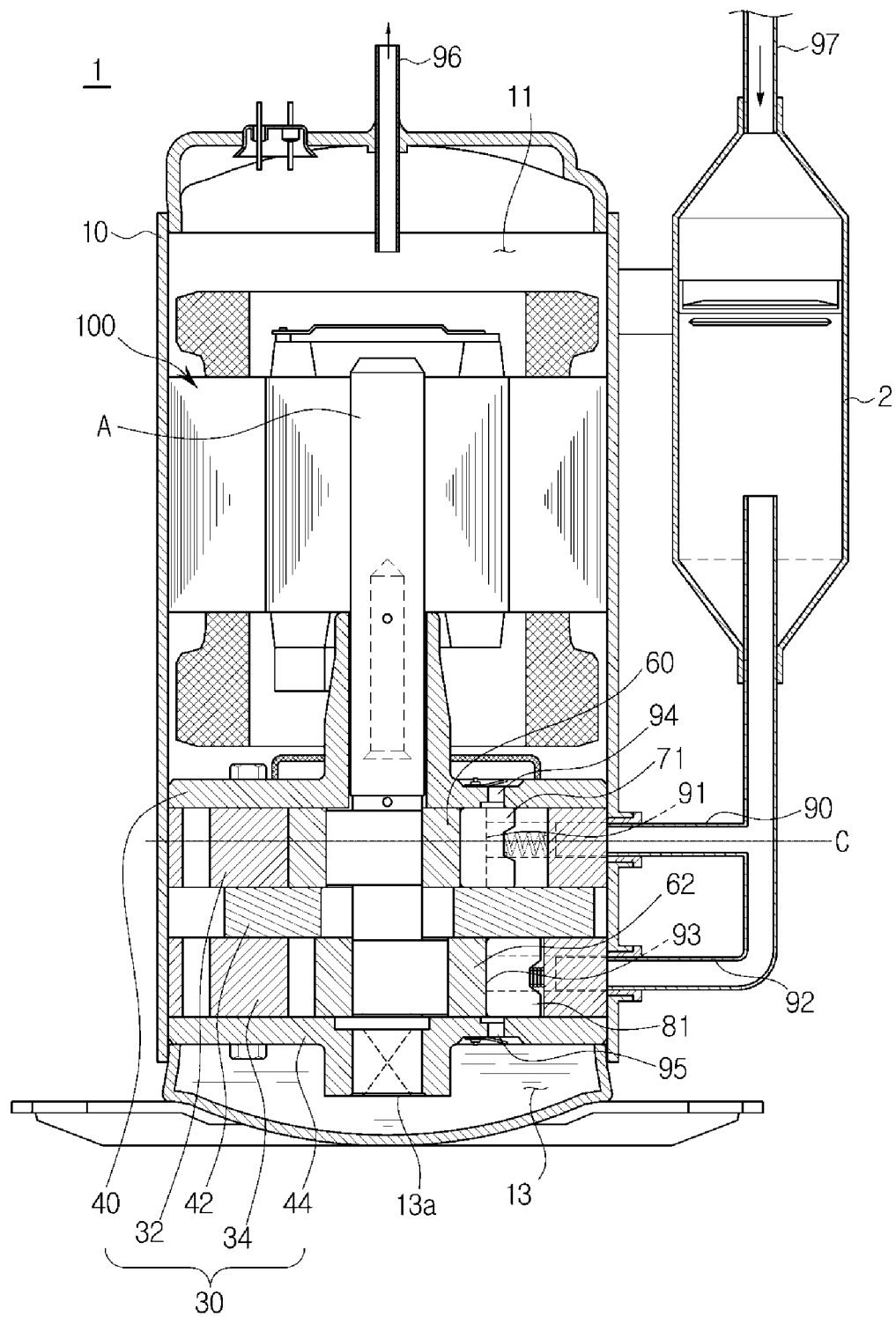
FIG. 1 is a structural diagram illustrating a compressor according to an exemplary embodiment of the disclosure.

Reference will now be made in detail to embodiments of the disclosure, the examples of which are illustrated in the accompanying drawings, wherein like reference numerals refer to like elements throughout.

A compressor and a motor included therein according to the embodiments of the disclosure will hereinafter be described with reference to the attached drawings.

Figure 2:
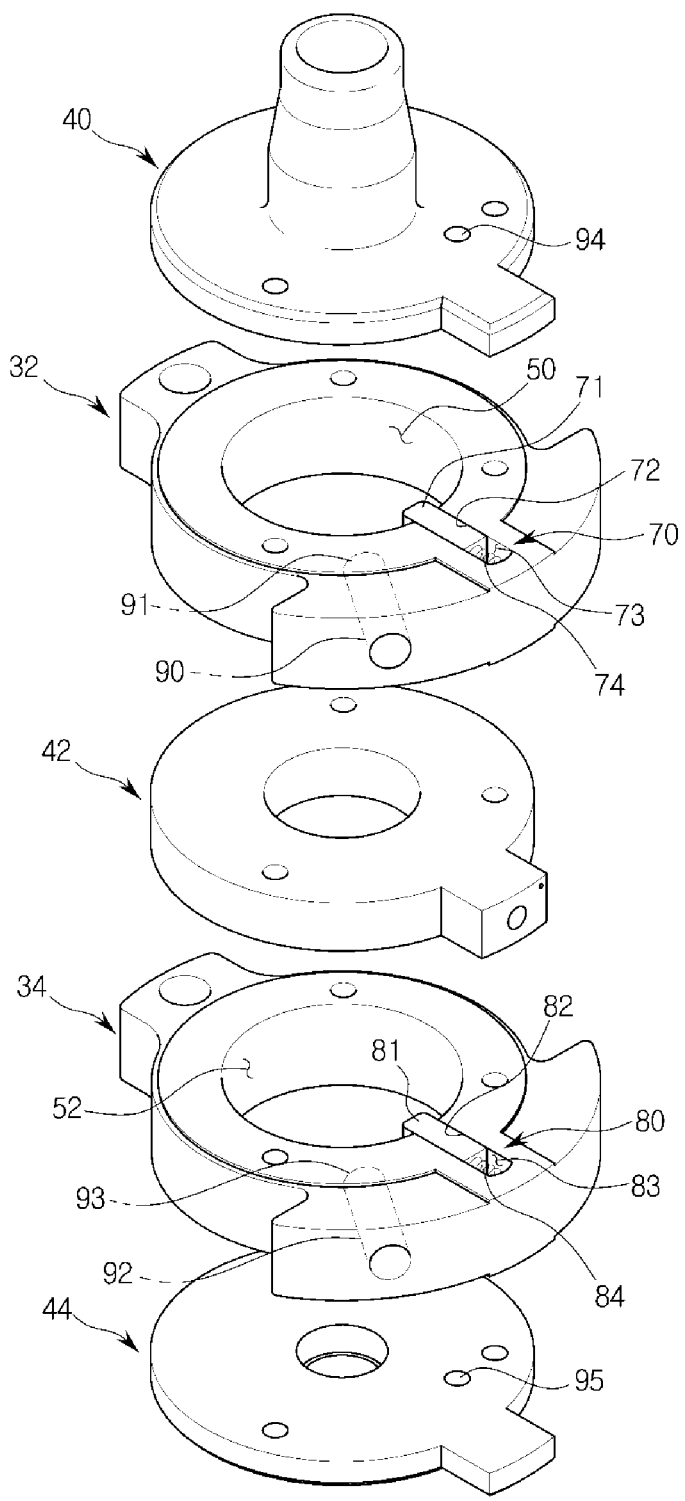
FIG. 2 is a structural view illustrating a compression unit of a compressor according to an exemplary embodiment of the disclosure.
Figure 3:
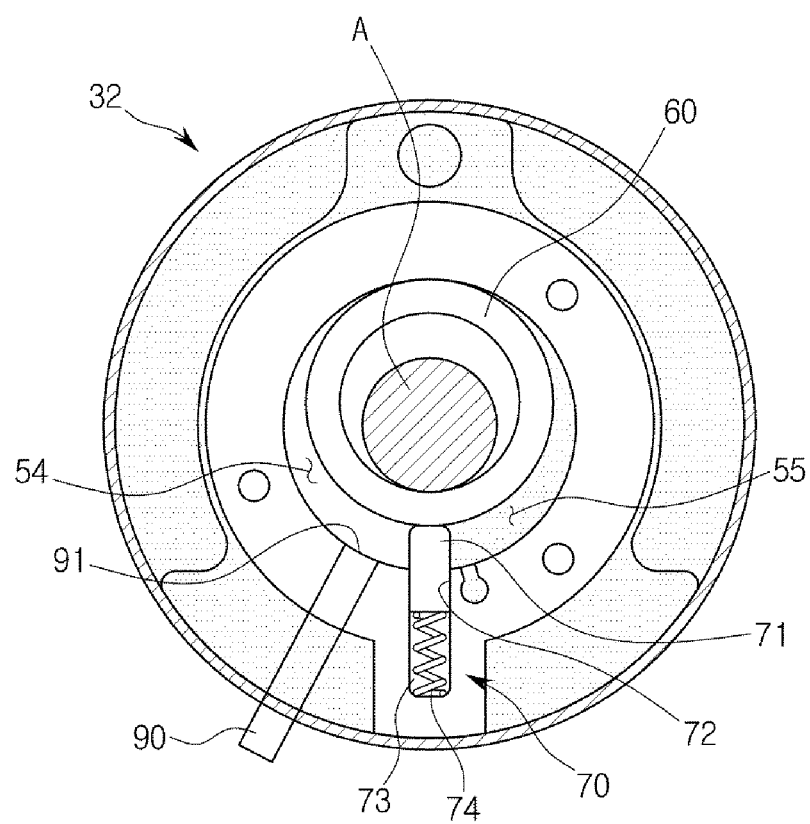
FIG. 3 is a cross-sectional view illustrating a specific part taken along the line C-C' of FIG. 2.

FIG. 1 is a structural diagram illustrating a compressor according to an exemplary embodiment of the disclosure. FIG. 2 is a structural view illustrating a compression unit of a compressor according to an exemplary embodiment of the disclosure. FIG. 3 is a cross-sectional view illustrating a specific part taken along the line C-C' of FIG. 2.

Referring to FIGS. 1 to 3, the compressor 1 may include a casing 10 located in close proximity to the accumulator 2 to form an external appearance of the compressor, a motor 100 installed in the casing 10 (e.g., at an inner upper part of the casing 10), and a compression unit 30 installed in the casing 10 (e.g., at an inner lower part of the casing 10) and connected to the motor 100 through a rotation axis A.

In addition, the casing 10 may include a refrigerant container 11 for including high-pressure gaseous refrigerant compressed by the compression unit 30 therein, and a compressor oil container 13 for including compressor oil through which the motor 100 rotates more easily and to reduce a temperature of the inside of the casing 10.

In addition, a compressor oil inlet 13a may be provided above the compressor oil container 13 in a manner that compressor oil is applied to the compression unit 30. For example, as shown in FIG. 1, compressor oil inlet 13 may be disposed at a central portion of the compressor oil container 13.

The compression unit 30 may include a plurality of cylinders (32, 34) installed in the casing 10 and having separated compression spaces (50, 52), and a plurality of bearing plates (40, 42, 44) for forming the compression spaces (50, 52) by covering upper and lower parts of each of the cylinders (32, 34).

The cylinders (32, 34) may include the compression spaces (50, 52) formed therein, rolling pistons (60, 62) to perform turning movement on the basis of different center points of the compression spaces (50, 52), vanes (71, 81) contacting the outer circumference of the rolling pistons (60, 62) to divide a suction chamber 54 and a compression chamber 55, and vane chambers (70, 80) depressed toward the outside of the compression spaces (50, 52) in a manner that the vanes (71, 81) move forward and backward.

The cylinders (32, 34) may include a first cylinder 32 having a first compression space 50 and a second cylinder 34 located below the first cylinder 32 and having a second compression space 52. Although compressor 1 has two cylinders (32, 34) as exemplarily shown in the drawings, the compressor 1 is not limited thereto, and the compressor 1 may include one cylinder or three or more cylinders.

The bearing plates (40, 42, 44) may form the compression spaces (50, 52) by covering upper and lower parts of each of the cylinders (32, 34).

A second plate 42 may be provided between the first cylinder 32 and the second cylinder 34. A first bearing plate 40 may be located above the first cylinder closes an upper opening of the first compression space 50. A third bearing plate 44 may be provided below the second cylinder 34 and closes a lower opening of the second compression space 52. In addition, the bearing plates (40, 42, 44) may support a rotation axis A of the motor 100.

The first cylinder 32 may include a first suction inlet 91 connected to a first suction pipe 90 in such a manner that gaseous refrigerant flows in the first compression space 50. The second cylinder 34 may include a second suction inlet 93 connected to a second suction pipe 92 in such a manner that gaseous refrigerant flows in the second compression space 52. The first suction pipe 90 and the second suction pipe 92 may be connected to the accumulator 2, as shown in FIG. 1. Also, the accumulator may receive refrigerant via inlet 97 and may store the refrigerant prior to the refrigerant entering the first suction pipe 90 and the second suction pipe 92.

The first bearing plate 40 may include a first outlet 94 through which gaseous refrigerant compressed in the first compression space 50 is discharged to the inside of the casing 10. The third bearing plate 44 may include a second outlet 95 through which gaseous refrigerant compressed in the second compression space 52 is discharged to the inside of the casing 10. When the compressor 1 is driven, the inside of the casing 10 is maintained at high pressure by the compressed gaseous refrigerant discharged through the outlets (94, 95), and the compressed gaseous refrigerant of the casing 10 is discharged to the outside through a discharge pipe 96 provided above the casing 10.

The first rolling piston 60 and the second rolling piston 62 may be coupled to the rotation axis A of the motor 300. In more detail, the first rolling piston 60 and the second rolling piston 62 may be coupled thereto on the basis of different center points. Through the above-mentioned structure, the first rolling piston 60 and the second rolling piston 62 eccentrically rotate in the compression spaces (50, 52) and may compress gaseous refrigerant.

The vanes (71, 81) may be composed of a first vane 71 contained in the first cylinder 32 and a second vane 81 contained in the second cylinder 34, and may be provided or disposed to contact the outer circumference of the rolling pistons (60, 62), so that the compression spaces (50, 52) are divided into a suction chamber 54 and a compression chamber 55.

The vane chambers (70, 80) may be recessed to the outside of the compression spaces (50, 52), and may be composed of a first vane chamber 70 contained in the first cylinder 32 and a second vane chamber 80 contained in the second cylinder 34.

The first vane chamber 70 may include a first vane guide 72 and a first vane spring container 73. The first vane guide 72 may guide the first vane 71 in a manner that the first vane 71 contacting the first rolling piston 60 moves forward and backward simultaneously with rotation of the first rolling piston 60. The first vane spring container 73 may include a first vane spring 74 for allowing the first vane 71 to pressurize the first rolling piston 60 in a manner that the first vane 71 may divide the first compression space 50 into a plurality of spaces.

In addition, the second vane chamber 80 may include a second vane guide 82 and a second vane spring container 83. The second vane guide 82 may be recessed toward the outside of the second compression space 52 and may guide the second vane 81. The second vane spring container 83 may include a second vane spring 84 for allowing the second vane 81 to pressurize the second rolling piston 62 in a manner that the second vane 81 may divide the second compression space 52 into a plurality of spaces.

Although the rotary compressor has been exemplarily disclosed above for convenience of description and better understanding of the disclosure, the rotary compressor is not limited thereto, and the rotary compressor according to the embodiment may also be applied to various reciprocating-type compressors.

Figure 4:
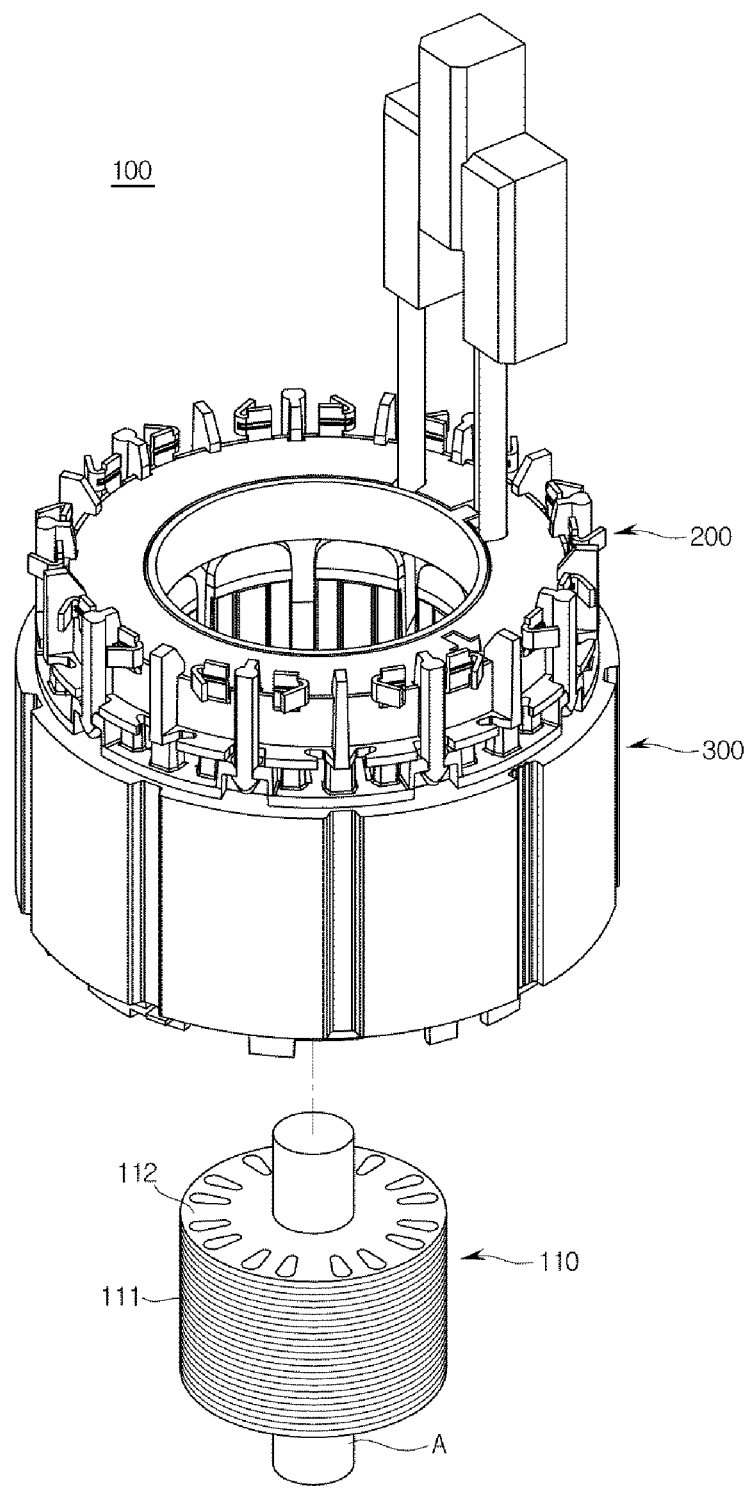
FIG. 4 is a structural view illustrating a motor according to an exemplary embodiment of the disclosure.

FIG. 4 is a structural view illustrating a motor according to an exemplary embodiment of the disclosure.

Referring to FIG. 4, the motor 100 according to an embodiment may include a rotor 110 and stators (200, 300). The stators (200, 300) may include a busbar assembly 200 and a stator assembly 300. The motor 100 may include a rotor 110, a stator assembly 300, and a busbar assembly 200. The rotor 110 may include a cylindrical rotor body 11 rotating about the rotation axis A, and a permanent magnet 112 recessed in the rotor body 111 to generate a magnetic field. Although FIG. 4 exemplarily shows the permanent magnet 112 buried in the rotor body 111, the permanent magnet 112 is not limited thereto. For example, a permanent magnet may be arranged along the outer circumference of the rotary body 111.

Figure 5:
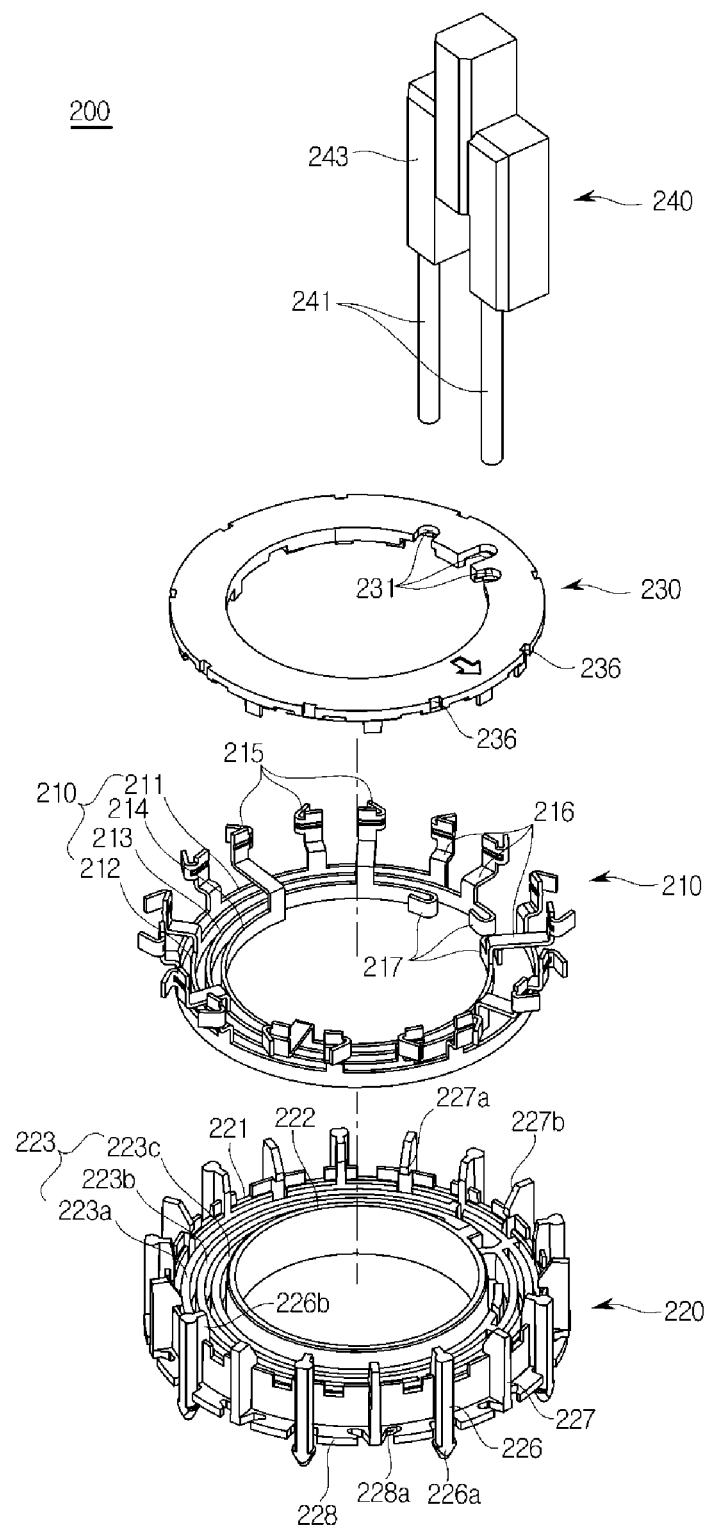
FIG. 5 is a structural view illustrating a busbar assembly contained in the motor according to an exemplary embodiment.
Figure 6:
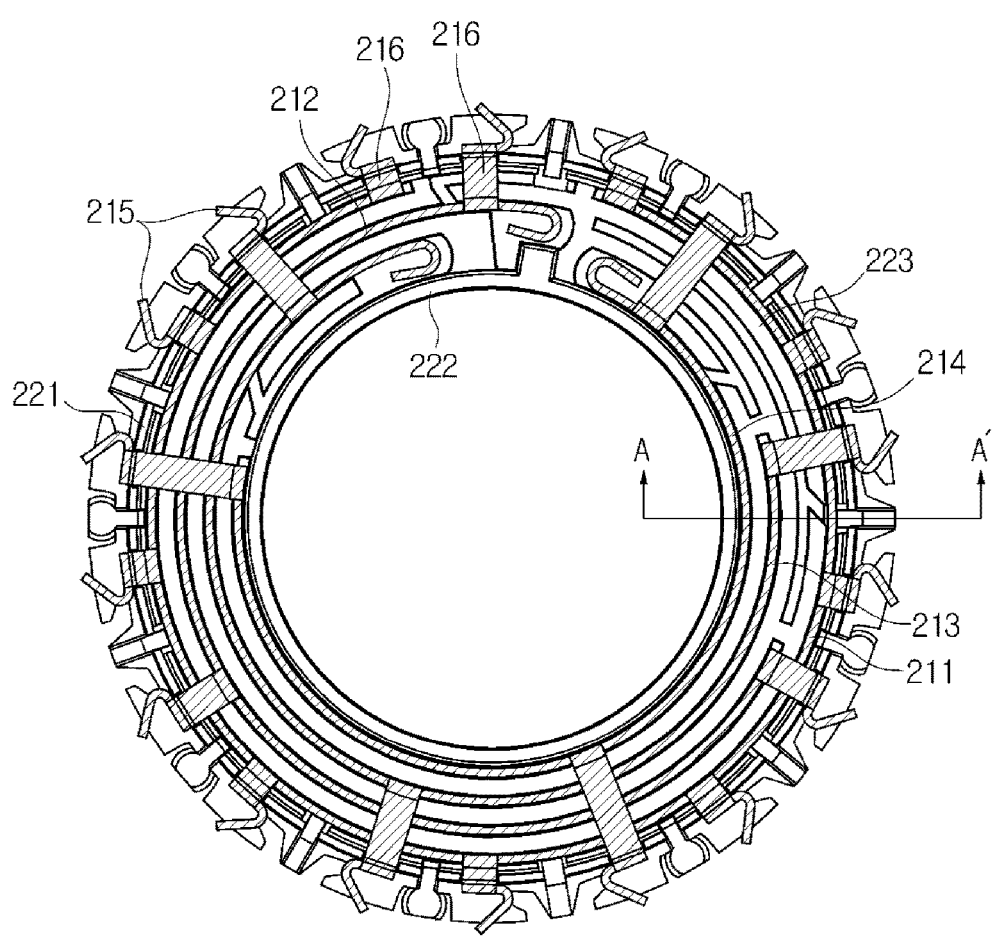
FIG. 6 shows the appearance of a motor's busbar seated in the busbar housing according to an exemplary embodiment.
Figure 7:
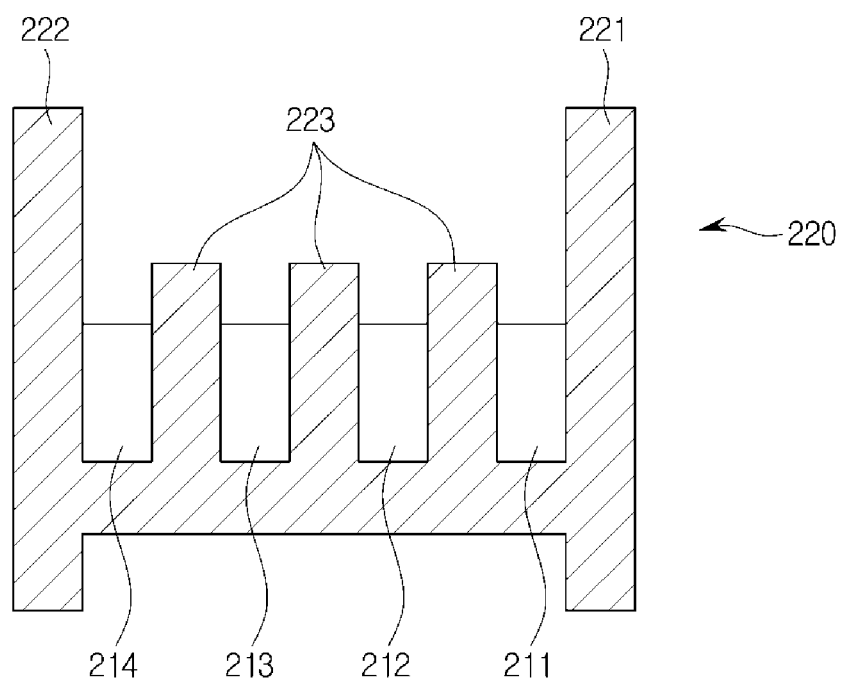
FIG. 7 is a cross-sectional view illustrating a specific part taken along the line A-A' of FIG. 6.

FIG. 5 is a structural view illustrating a busbar assembly contained in the motor according to an exemplary embodiment. FIG. 6 shows the appearance of a motor's busbar seated in the busbar housing according to an exemplary embodiment. FIG. 7 is a cross-sectional view illustrating a specific part taken along the line A-A' of FIG. 6.

Referring to FIGS. 5 to 7, the busbar assembly 200 may include a busbar terminal 240 to connect windings constructing each coil to an external driving circuit (not shown), a busbar group 210 (including 211, 212, 213, 214) to electrically interconnect the coils according to a U phase, V phase, W phase, and a common neutral point, a busbar housing 220 including the busbar group 210, and a housing cover 230 to cover an upper part of the busbar housing 220.

Referring to FIG. 5, the busbar terminal 240 may include a lead wire 241 for extending the coil contained in the stator assembly 300 to the outside, and a terminal coupling terminal 243 coupled to the external driving circuit (not shown).

One end of the lead wire 241 may be connected to the terminal coupling terminal 243, and the other end thereof may be connected to the housing cover 230. In addition, if the motor 100 according to an embodiment constructs a 3-phase motor, the lead wire 241 may include a U-phase wire, a V-phase wire, and a W-phase wire.

The terminal coupling terminal 243 may be provided at one end of the lead wire 241, so that the coil extended to the outside by the lead wire 241 is coupled to the external driving circuit (not shown). In addition, if the motor 100 constructs the 3-phase motor, the terminal coupling terminal 241 may include a U-phase terminal, a V-phase terminal, and a W-phase terminal.

Referring to FIG. 5, the busbar group 210 may include first, second, third, and fourth busbars (211, 212, 213, 214) having a plurality of circular arcs, and the respective busbars (211, 212, 213, 214) may be formed of a conductive material. In the case of each busbar (211, 212, 213, or 214), the width (corresponding to a vertical direction from FIG. 5) of the central axis of the above-mentioned concentric circle is larger than the width (corresponding to a horizontal direction from FIG. 5) of a radius direction of the concentric circle.

Each busbar (211, 212, 213, 214) may include a winding coupling unit 215 connected to the winding constructing the coil of the stator assembly 300 (See FIG. 4), a busbar extending unit 216 for extending the winding coupling unit 215 from each busbar (211, 212, 213, 214) to the outer circumference of the busbar housing 220, and a terminal coupling unit 217 configured to couple each busbar (211, 212, 213, 214) to the lead wire 241.

Referring to FIG. 6, the winding coupling unit 215 may be extended in a radial direction from each busbar (211, 212, 213, 214) by the busbar extending unit 216, such that the winding coupling unit 215 is provided outside the busbar housing 220.

Referring to FIG. 6, the terminal coupling unit 217 may be formed by one end of each busbar (211, 212, 213, 214) curved in a radius direction or radial direction (e.g., to form a substantially U-shape at the end of the busbar), and the terminal coupling unit 217 may be coupled to the lead wire 111.

The first busbar 211 has the shape of an arc of the circle having a first radius, and may be arranged at the outermost side of the busbar group 210.

In addition, the first busbar 211 may form a common neutral point of the windings, and may include at least 6 winding coupling units 215.

For example, according to the parallel winding scheme in which the stator 310 may include 9 teeth and slots and each of the teeth of the stator 310 may be wound with one winding so that the coil is formed. The first busbar 211 may include 9 winding coupling units 215 connected to one end of each winding as shown in FIG. 5. That is, the number of winding coupling units connected to the outermost busbar (first busbar 211 in FIG. 5) may correspond to the number of teeth included in the stator 310. For example, as shown in FIG. 6, every other winding coupling unit among the 18 winding coupling units which are disposed circumferentially about the busbar group 210, may correspond to a winding coupling unit included in the first busbar 211.

In addition, the first busbar 211 may form a common neutral point, so that it may not include the terminal coupling unit 217.

The second, third, and fourth busbars (212, 213, 214) may respectively have an arc shape of a circle having a second radius, an arc shape of a circle having a third radius, and an arc shape of a circle having a fourth radius. In addition, the second to fourth busbars (212, 213, 214) may be arranged in the order of second busbar 212→third busbar 213→fourth busbar 214 from the outside of the busbar group 210 toward a center of the busbar group 210, and the fourth busbar 214 may be arranged at the innermost angle of the busbar group 210.

The second, third, and fourth busbars (212, 213, 214) may respectively form a U-phase, a V-phase, and a W-phase, and may include at least one winding coupling unit 215 and at least one terminal coupling unit 217.

For example, as shown in FIG. 5, according to a parallel winding scheme in which the stator 100 may include 9 teeth and slots and a single winding is formed per tooth of the stator 100, each of the second, third and fourth busbars (212, 213, 214) may include three winding coupling units 215. For example, as shown in FIG. 6, every other winding coupling unit among the 18 winding coupling units which are disposed circumferentially about the busbar group 210, may correspond to one of the winding coupling units included in the second, third and fourth busbars (212, 213, 214). For example, as shown in FIG. 6, every other winding coupling unit among the 18 winding coupling units which are disposed circumferentially about the busbar group 210, may alternate between one of the second, third and fourth busbars (212, 213, 214). That is, if the even-number winding coupling units correspond to winding coupling units of the second, third and fourth busbars (212, 213, 214), the second winding coupling unit may correspond to the second busbar 212, the fourth winding coupling unit may correspond to the third busbar 213, and the sixth winding coupling unit may correspond to the fourth busbar 214, and so on. Meanwhile, the odd numbered winding coupling units among the 18 winding coupling units may correspond to the first busbar 211.

The busbar housing 220 may have a cylindrical shape having hollows as shown in FIG. 5. In addition, the busbar housing 220 may include an outer circumferential wall 221 and an inner circumferential wall 222, and may include the busbar group 210 interposed between the housing outer-circumferential wall 221 and the housing inner-circumferential wall 222.

In order to insulate the respective busbars (211, 212, 213, 214), the busbar housing 220 may be formed of a non-conductive material, and a ring-shaped barrier 223 for isolating each of the first to fourth busbars (211, 212, 213, 214) may be disposed between the housing outer-circumferential wall 221 and the housing inner-circumferential wall 222.

The ring-shaped barrier 223 may include a first ring-shaped barrier 223a for isolating each of the first busbar 211 and the second busbar 212, a second ring-shaped barrier 223b for isolating each of the second busbar 212 and the third busbar 213, and a third ring-shaped barrier 223c for isolating each of the third busbar 213 and the fourth busbar 214.

The ring-shaped barrier 223 may be higher in height than each busbar (211, 212, 213, 214) in such a manner that the busbar extending unit 216 radially extended from each busbar (211, 212, 213, 214) does not contact each busbar (211, 212, 213, 214).

If the busbar group 210 is seated in the busbar housing 220, each of the first, second, third, and fourth busbars (211, 212, 213, 214) may be isolated by the ring-shaped barrier 223 as shown in FIGS. 6 and 7.

The first, second, third, and fourth busbars (211, 212, 213, 214) may be respectively isolated by the ring-shaped barrier 223.

A stator hook bar 226 and a cover hook bar 227 may be alternately arranged along the outer circumference of the busbar housing 220 at the outside of the busbar outer-circumferential wall 221, and a first guide plate 228 protruded in a radial direction of the busbar housing 220 may also be provided at the outside of the busbar outer-circumferential wall 221.

A stator hook bar 226 and a cover hook bar 227 are alternatively arranged along the outer circumference of the busbar housing 220, and a first guide plate 228 may be disposed between the stator hook bar 226 and the cover hook bar 227.

The stator hook bar 226 may be arranged at an outer surface of the housing outer-circumferential wall 221 in an axial direction of the busbar housing 220.

In addition, a stator hook 226a having a larger diameter than the stator hook bar 226 may be provided below the stator hook bar 226, so that the busbar assembly 200 is connected to the stator assembly 300 as described above.

A coupling structure between the busbar assembly 200 and the stator assembly 300 will hereinafter be described in detail.

In addition, a cover guide bar 226b integrated with the stator hook bar 226 may be disposed in the stator hook bar 226.

The cover guide bar 226b may be disposed in correspondence to the cover guide groove 236 provided in the busbar housing cover 230 to be described later, so that the cover guide bar 226b directs the busbar housing cover 230 in such a manner that the busbar housing cover 230 may be seated at an appropriate position of the busbar housing 220.

The cover hook bar 227 may be provided in the axial direction of the busbar housing at an outer surface of the housing outer-circumferential wall 221 in the same manner as in the stator hook bar 226.

The cover hook 227a including a cover hook inclined surface 227b may be provided above the cover hook bar 227, so that the busbar housing cover 230 is coupled to the busbar housing 220.

In more detail, the busbar housing cover 230 may move toward the coupling position along the cover hook inclined surface 227b of the cover hook 227a. While the busbar housing cover 230 moves toward the coupling position along the cover hook inclined surface 227b, the cover hook bar 227 may be tilted in a radial direction of the busbar housing 220.

If the busbar housing cover 230 arrives at the coupling position, the hook bar 227 returns to its own original position due to elastic force, and the busbar housing cover 230 may be caught in the cover hook 227a.

Since the busbar housing cover 230 is caught in the cover hook 227a, the busbar housing cover 230 may be prevented from being separated from the busbar housing 220.

The first guide plate 228 may be radially protruded from the housing outer-circumferential wall 221 of the busbar housing 220, and the winding guide groove 228a for directing the winding constructing the coil of the stator 100 may be disposed at one side of the first guide plate 228.

The winding guide groove 228a may be formed in a manner that the winding of the stator 100 is bent toward the winding coupling unit 215 of the above-mentioned busbars (211, 212, 213, 214). In this case, the winding guide groove 228a may be formed in a manner that the winding is bent in a circumferential direction of the stator 100, so that the winding is prevented from being protruded toward the outside of the stator 100.

The winding arrangement based on the winding guide groove 228a will hereinafter be described in detail.

The busbar housing cover 230 may have a ring-shaped structure having hollows as shown in FIG. 5. In addition, the busbar housing cover 230 may be formed of a non-conductive material such as (which is the same as) the busbar housing 220. However, the disclosure is not so limited and the busbar housing cover 230 may be formed of a non-conductive material which is different from the non-conductive material forming the busbar housing 220.

A terminal insertion groove 231 for coupling the busbar terminal 240 (See FIG. 4) to the busbar assembly 200 may be provided at a specific position corresponding to the terminal coupling unit 217 of the busbar group 210 on the inner circumference of the busbar housing cover 230. A lead wire 241 (See FIG. 4) of the busbar terminal 240 (See FIG. 4) may be inserted into the terminal insertion groove 231, such that the lead wire 241 is connected to the terminal coupling unit 217 of the busbar group 210.

The cover guide groove 236 may be disposed in correspondence to the stator hook bar 226 of the busbar housing 220 at an outer circumference of the busbar housing cover 230, such that the busbar housing cover 230 may be seated at an appropriate position of the busbar housing 220.

Figure 8:
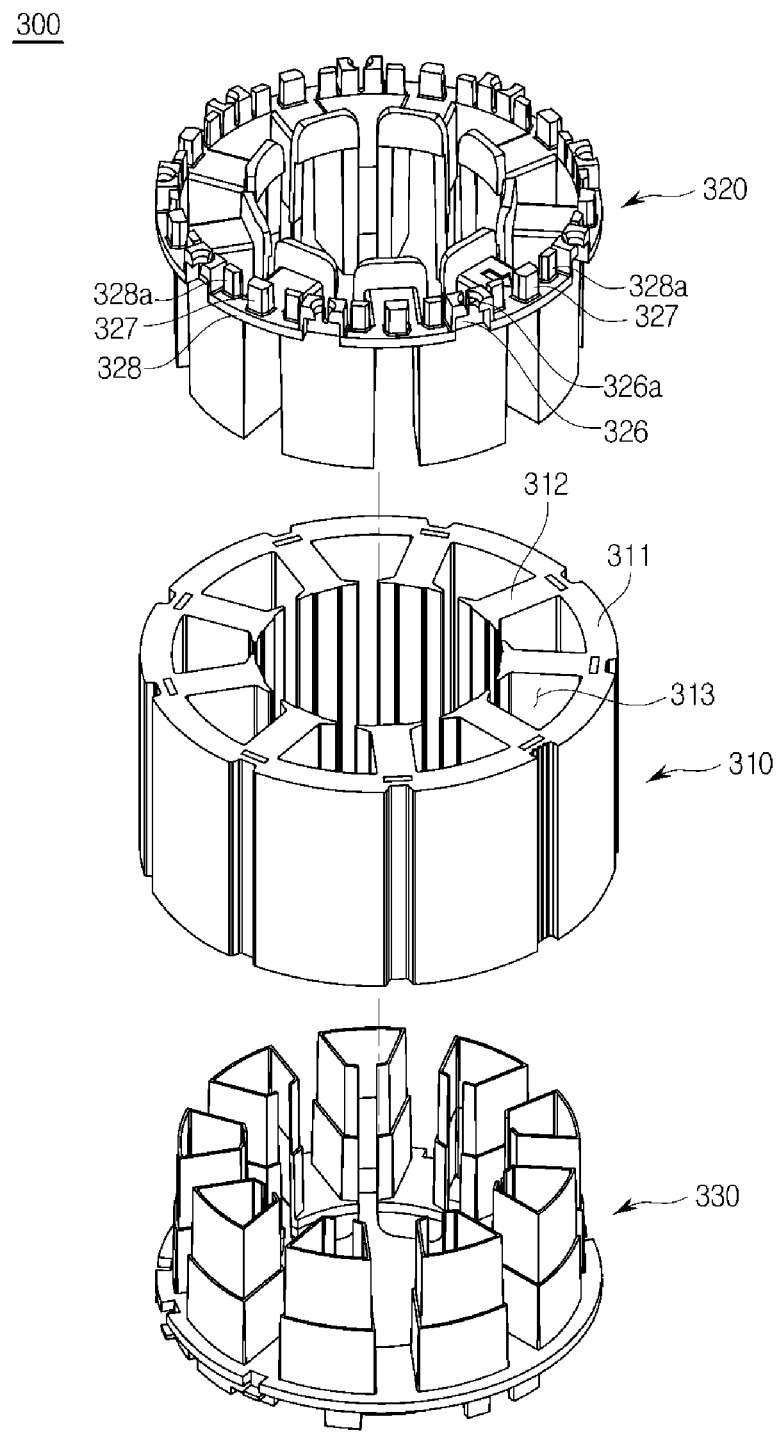
FIG. 8 is a structural view illustrating a stator assembly contained in the motor according to an exemplary embodiment.

FIG. 8 is a structural view illustrating a stator assembly contained in the motor according to an exemplary embodiment.

Referring to FIG. 8, the stator assembly 300 may include a stator 310, an upper insulator 320, a lower insulator 330, and a coil (not shown).

The stator 310 may be formed of a magnetic material capable of being magnetized by a magnetic field formed by the coil. The stator 310 may include a cylindrical stator body 311 having a hollow, and may include teeth 312 protruded inward from the inner circumference of the stator body 311.

The teeth 312 may be arranged along the inner circumference of the stator body 311 (e.g., at equal or regular intervals). For example, 9 teeth may be arranged along the inner circumference of the stator body 311 as shown in FIG. 8. However, the disclosure is not so limited, and the number of teeth may be less than nine or more than nine. Further, the teeth may be arranged along the inner circumference of the stator body at irregular intervals.

A slot 313 may be formed between neighboring teeth 312, and the winding 120 (see FIG. 10) may be wound on the outer surface of the teeth 312 through the slot 313, resulting in formation of the coil.

The insulators (320, 330) for insulating between the coil and the teeth 312 may be formed by combination of an upper insulator 320 and a lower insulator 330, and may be formed of a non-conductive material insulating between the coil and the teeth 312.

The upper insulator 320 may be coupled to the busbar housing 220 (See FIG. 5) of the busbar assembly 200 (See FIG. 5).

The hook engaging part 326 may be provided in correspondence to the above-mentioned stator hook bar 226 (See FIG. 5) at one side of the upper insulator 320. In more detail, as shown in FIG. 8, the hook engaging part 326 may be provided at a location corresponding to the stator hook bar 226 (See FIG. 5) along the outer circumference of the upper insulator 320.

Specifically, the hook engaging part 326 may be disposed at a location corresponding to the slot 313 of the stator 310. That is, the stator hook bar 226 (See FIG. 5) of the busbar housing 220, the hook engaging part 326 of the upper insulator 320, and the slot 313 of the stator 310 may be provided at their association (corresponding) positions.

In addition, the hook insertion hole 326a in which the stator hook 226a of the stator hook bar 226 is inserted may be provided above the hook engaging part 326. The hook insertion hole 326a may have a diameter similar to that of the stator hook bar 226, and may have a smaller diameter than the stator hook 226a provided at one end of the stator hook bar 226.

The hook engaging part 326 may be cut in the vicinity of the hook insertion hole 326a. By the cut hook engaging part 326, the stator hook 226a having a large diameter may be inserted into the hook insertion hole 326a having a smaller diameter.

In addition, after the stator hook 226a is inserted into the hook insertion hole 326a, the stator hook 226a may not easily be separated from the hook insertion hole 326a.

In addition, a second guide plate 328 may radially protrude from the upper insulator 320 and may be disposed between the neighboring hook engaging parts 326. The second guide plate 328 may be provided in correspondence to the first guide plate 228 (See FIG. 5) of the above busbar housing 220 (See FIG. 5).

A supporting bar 327 may protrude in the axial direction of the stator assembly 300 and may be provided above the second guide plate 328, and may be formed at a position corresponding to a cover hook 227 (See FIG. 5) of the busbar housing 220 (See FIG. 5).

In addition, the supporting bar 327 may be provided at a position corresponding to the teeth 312 of the stator 310. In other words, the cover hook bar 227 (See FIG. 5) of the busbar housing 220 (See FIG. 5), the supporting bar 327 of the upper insulator 320, and the teeth 312 of the stator 310 may be provided at their association (corresponding) positions.

A winding guide 328a provided from the top surface of the second guide plate 328 in the axial direction of the stator assembly 300 may be provided at both sides of the supporting bar 327. The winding guide bar 328a may be formed to bend the winding constructing (forming) the coil toward the winding guide groove 228a (See FIG. 5) of the busbar housing 220 (See FIG. 5). As described above, the winding guide bar 328a may be formed to bend the winding toward the circumferential direction of the stator 100, so that it may prevent the winding from being protruded toward the outside of the stator 100.

The winding constructing (forming) the coil passes between the hook engaging part 326 and the winding guide bar 328a, and passes through the winding guide groove 228a of the busbar housing 220 (See FIG. 5) so that the winding is extended to the winding coupling unit 215 of the busbar group 210.

Constituent elements of the motor 100 according to one or more example embodiments of the disclosure have been disclosed above.

A coupling structure between the busbar assembly 200 and the stator assembly 300 contained in the stator 100 and the winding arrangement caused by the busbar assembly 200 will hereinafter be described in detail.

Figure 9:
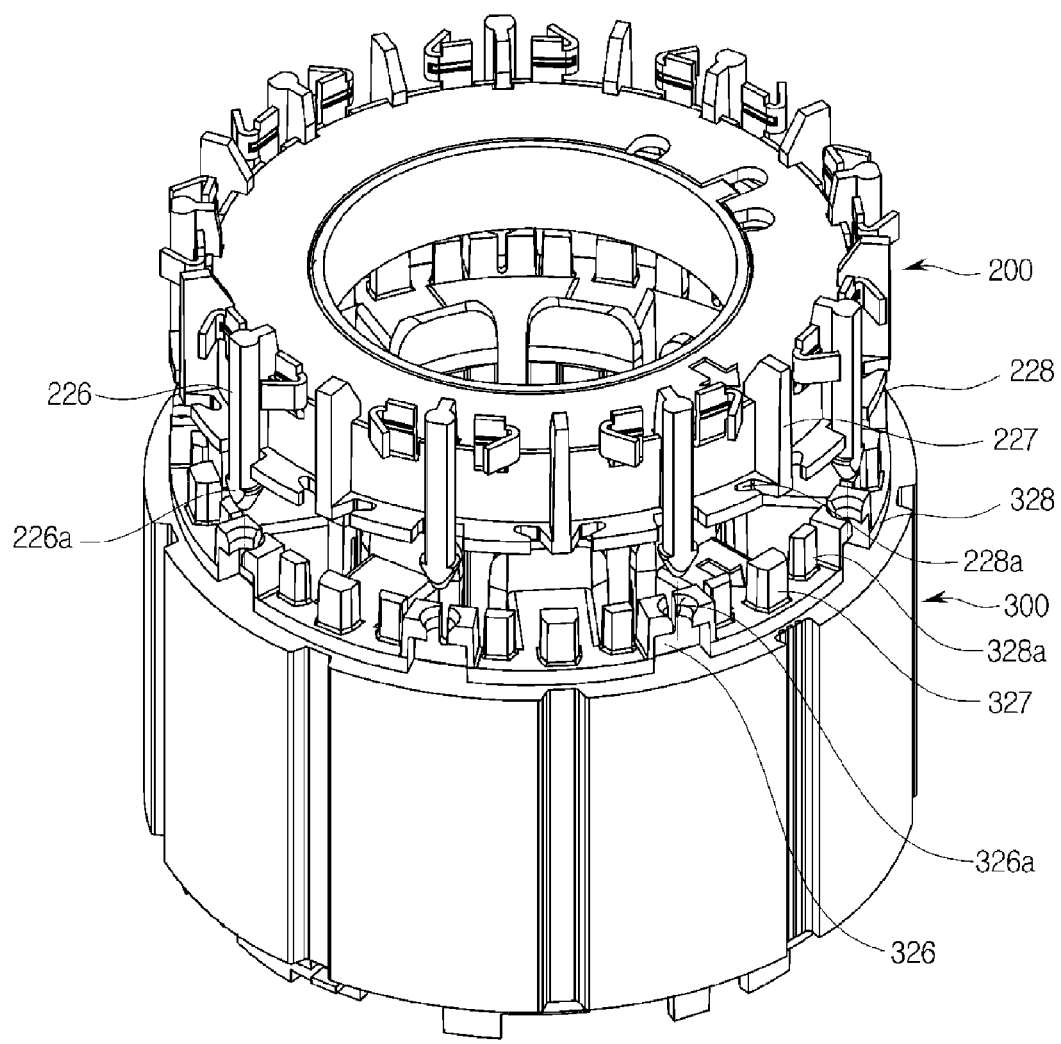
FIG. 9 is a structural view illustrating that a busbar assembly contained in the motor is connected to a stator assembly according to an exemplary embodiment.

FIG. 9 is a structural view illustrating that the busbar assembly contained in the motor is connected to the stator assembly according to an exemplary embodiment.

Referring to FIG. 9, the busbar assembly 200 may be coupled to the stator assembly 300 in a manner that the busbar housing 220 of the busbar assembly 200 faces the upper insulator 320 of the stator assembly 300.

In more detail, the busbar assembly 200 may be coupled to the stator assembly 300 in a manner that a hollow formed in the center part of the busbar assembly 200 is connected to a hollow formed in the center part of the stator assembly 300.

In order to couple the busbar assembly 200 and the stator assembly 300 with each other, the stator hook 226a of the stator hook bar 226 may be inserted into the hook insertion hole 326a of the hook engaging part 326. In addition, if the stator hook 226a is inserted into the hook insertion hole 326a, the cut hook engaging part 326 is split in two so that a diameter of the hook insertion hole 326a becomes larger, and the stator hook 226a may pass through the hook insertion hole 326a having a larger diameter.

If the stator hook 226a passes through the hook insertion hole 326a, the hook engaging part 326 returns to its own original position due to elastic force, and the diameter of the hook insertion hole 326a also returns to its own original position, so that the stator hook 226a is caught in the hook engaging part 326.

As described above, since the stator hook 226a is caught in the hook engaging part 326, the busbar assembly 200 is coupled to the stator assembly 300.

If the busbar assembly 200 is coupled to the stator assembly 300, the stator hook bar 226 and the hook engaging part 326 may be located in a straight line along the axial direction, and the cover hook bar 227 and the supporting bar 327 may be located or disposed in a straight line along the axial direction.

Figure 10:
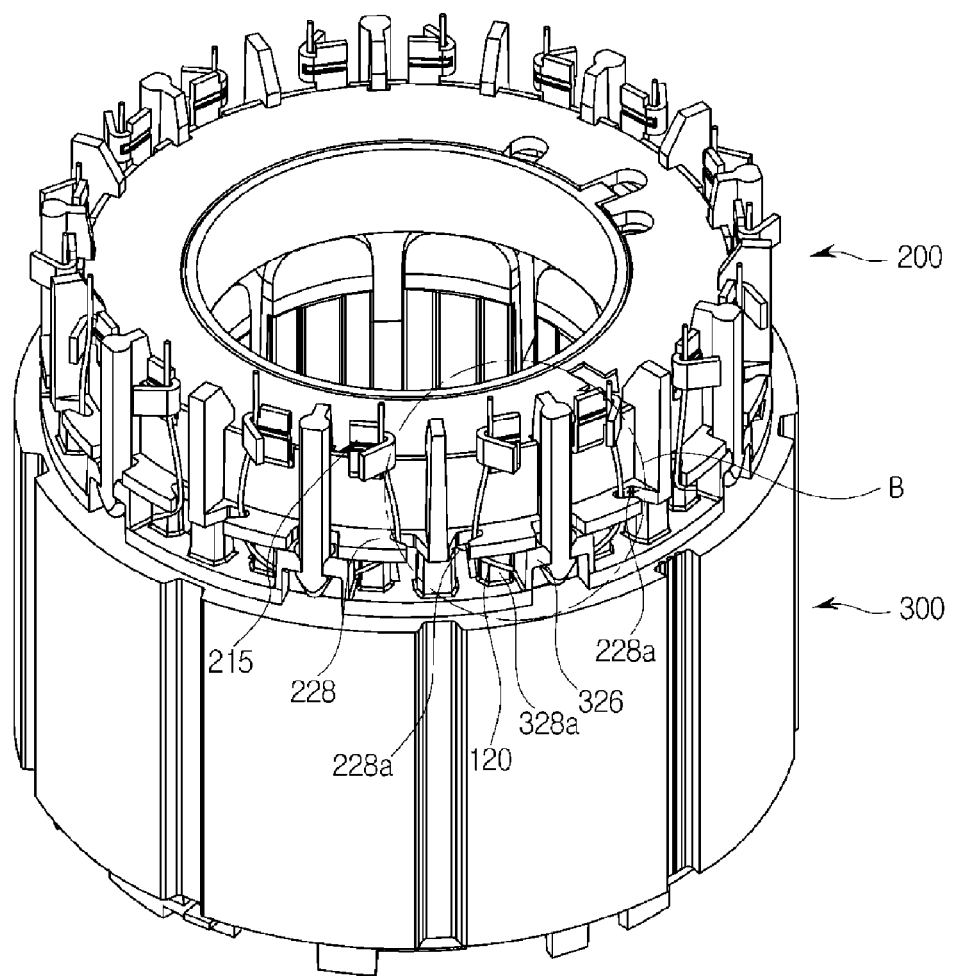
FIG. 10 is a structural view illustrating that windings are connected to the busbar assembly contained in the motor according to an exemplary embodiment.
Figure 11:
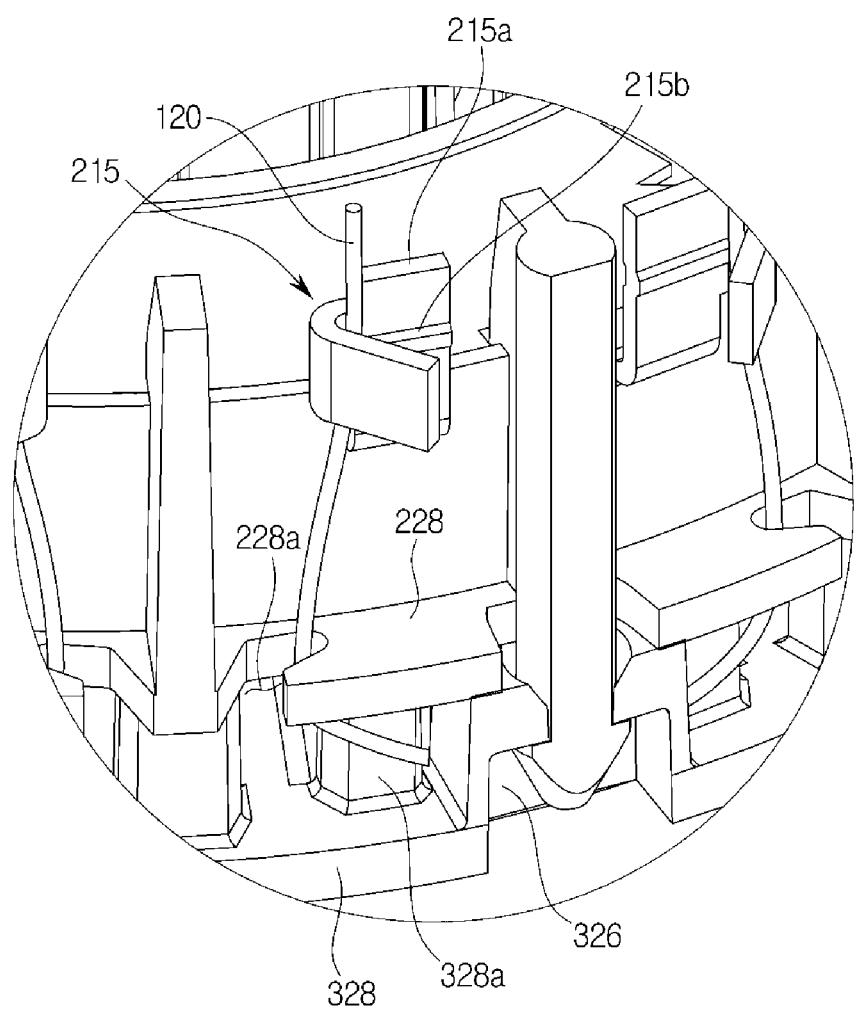
FIG. 11 is an enlarged view illustrating a region B of FIG. 10.

FIG. 10 is a structural view illustrating that windings are connected to the busbar assembly contained in the motor according to an exemplary embodiment. FIG. 11 is an enlarged view illustrating a region B of FIG. 10.

Referring to FIGS. 10 and 11, the winding 120 constructing (forming) the coil of the stator 100 may be formed to pass between the hook engaging part 326 of the stator assembly 300 and the winding guide bar 328a, and may be extended to the outside of the stator assembly 300.

The winding 120 extended to the outside of the stator assembly 300 may be bent toward the winding guide groove 228a of the busbar assembly 200 along the outer surface of the winding guide bar 328a. In addition, the winding 120 bent toward the winding guide groove 228a may pass through the winding guide groove 228a, and may be bent again toward the winding coupling unit 215. In addition, the winding 120 bent toward the winding coupling unit 215 may be coupled to the winding coupling unit 215.

As described above, after the winding 120 has been extended to the outside of the stator assembly 300, the winding 120 may be bent twice. In more detail, the winding 120 may be bent once by the winding guide bar 328a, and may be bent again by the winding guide groove 228a.

The winding guide bar 328a and the winding guide groove 228a provide a support point at which the winding 120 is bent so that the winding 120 may be tightly fixed. In addition, the winding guide bar 328a and the winding guide grove 228a may be formed to bend the winding 120 toward the circumferential direction of the stator 300, so that they may prevent the winding 120 from being protruded toward the outside of the stator 300.

Referring to FIGS. 10 and 11, the winding coupling unit 215 may include a folded plate 215a. The folded plate 215a may have the shape of a folded plate (or a substantially U-shape) so that one side thereof is opened and the other side is closed.

The winding 120 may be inserted into the folded plate 215a through the opened one side of the folded plate 215a.

If the winding 120 is inserted into the folded plate 215a, the folded plate 215a may be completely folded so that the winding 120 may be fixed to the folded plate 215a. Thereafter, if a current is applied to the winding 120, the winding 120 may emit heat by contact resistance between the winding 120 and the folded plate 215a, so that the winding 120 is welded to the winding coupling unit 215.

In addition, a coupling protrusion part 215b may be provided at the center part of the folded plate 215a, and the coupling protrusion part 215a may prevent the winding 120 from being short-circuited by an edge of the folded plate 215a.

However, the winding coupling unit 215 is not limited only to the folded plate 215a formed when one side of the winding coupling unit 215 is folded.

A method for coupling the winding 120 of the stator assembly 300 to the winding coupling unit 215 of the busbar assembly 200 will hereinafter be described.

Figure 12:
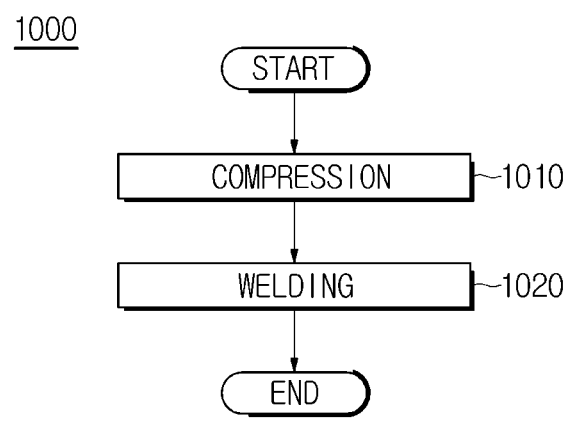
FIG. 12 is a flowchart illustrating a coupling process for combining windings contained in the motor with a winding coupling unit.
Figure 13:
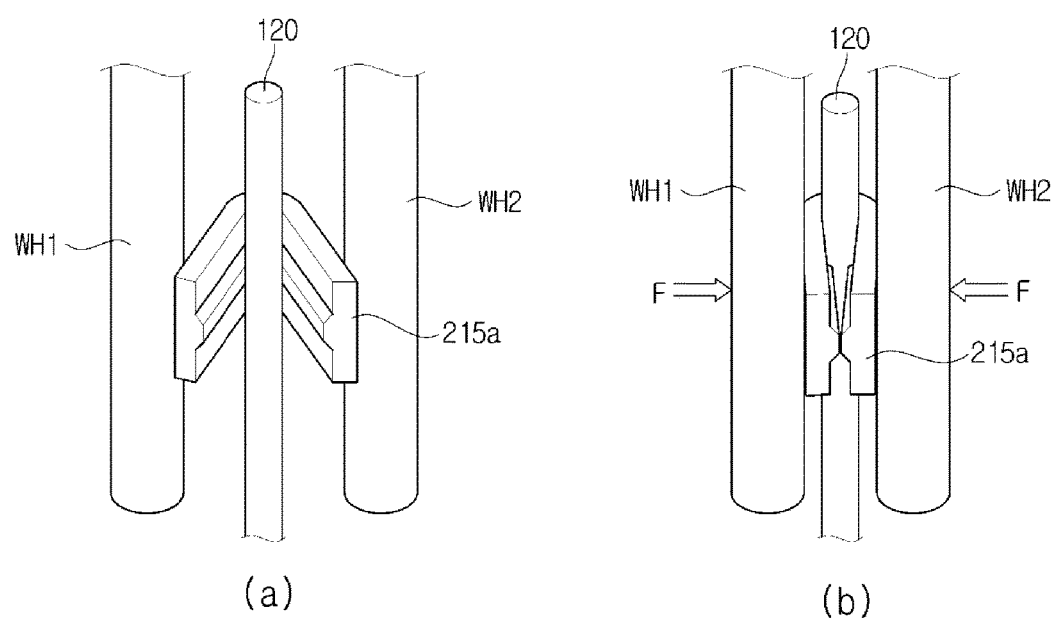
FIG. 13 is a conceptual diagram illustrating a compression process contained in the coupling process of FIG. 12.
Figure 14:
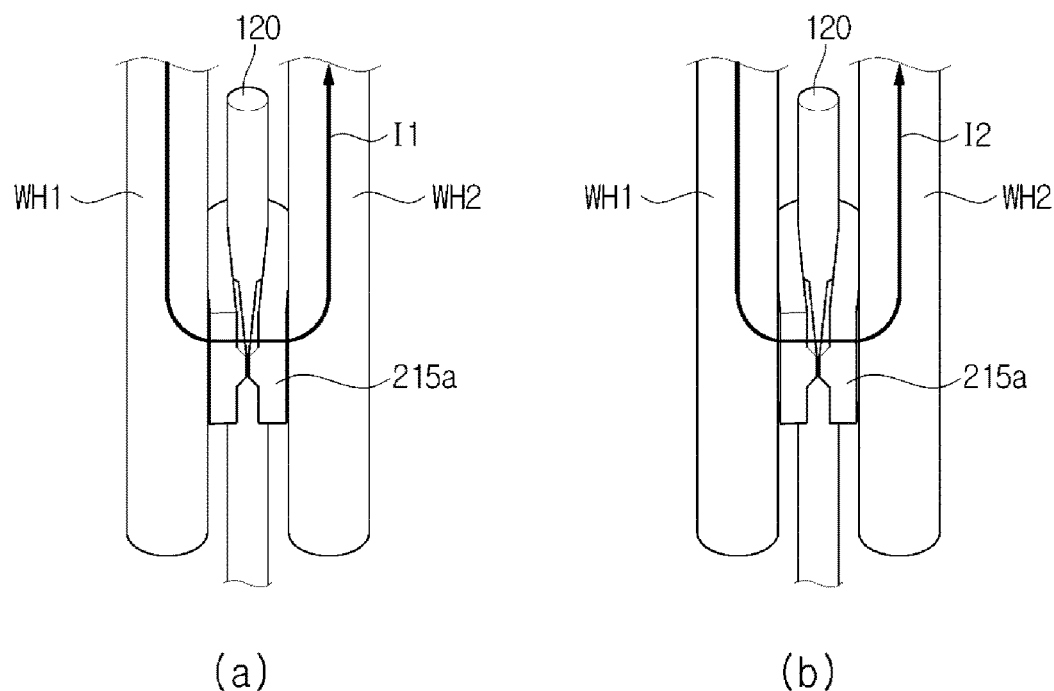
FIG. 14 is a conceptual diagram illustrating a welding process contained in the coupling process of FIG. 12.

FIG. 12 is a flowchart illustrating a coupling process for combining the windings contained in the motor with the winding coupling unit. FIG. 13 is a conceptual diagram illustrating a compression process contained in the coupling process of FIG. 12. FIG. 14 is a conceptual diagram illustrating a welding process contained in the coupling process of FIG. 12.

The coupling process for electrically coupling the winding 120 of the stator assembly 300 to the winding coupling unit 215 of the busbar assembly 200 will hereinafter be described with reference to FIGS. 12 to 15.

For example, the coupling process may include a compression process 1010 for fixing the winding 120 to the winding coupling unit 215 is performed. The compression process 1010 indicates that physical force is applied to contact the winding 120 and the winding coupling unit 215 with each other. The compression process may correspond to a first operation of the coupling process for electrically coupling the winding 120 of the stator assembly 300 to the winding coupling unit 215 of the busbar assembly 200.

The compression process 1010 may include a process or operation for inserting the winding 120 into one pair of plates of the folded plate 215a through the opened one side of the folded plate 215a.

In addition, after the winding 120 has been inserted between one pair of plates of the folded plate 215a, the compression process 1010 may include a process for locating a pair of welding heads (WH1, WH2) at the outside of the folded plate 215a as shown in FIG. 13(a).

In addition, after one pair of welding heads (WH1, WH2) has been located at the outside of the folded plate 215a, the compression process 1010 may include a process or operation for allowing one pair of welding heads (WH1, WH2) to bidirectionally pressurize the folded plate 215a.

If the folded plate 215a is pressurized, one side (or both sides) of the folded plate 215a at the open end may be closed as shown in FIG. 13(b), and the winding 120 is physically fixed to the folded plate 215a.

After completion of the compression process 1010, the welding process 1020 for welding (or fusing) the winding 120 to the winding coupling unit 215 may be performed. The welding process 1020 indicates a heating process in which the winding 120 and the winding coupling unit 215 are fused and interconnected.

For example, the welding process 1020 may provide a welding current to a contact surface to be welded, and may include a process of resistance welding in which a contact surface is welded using heat generated by electrical resistance of the contact surface. In this case, the heat generated from the contact surface may be proportional to the square of a welding current, and may also be proportional to a supply time of the welding current.

For example, the welding process 1020 may be a resistance welding process for welding a contact surface using the welding current.

In order to remove a covering (or coating) of the winding 120 as shown in FIG. 14(a), the welding process 1020 may include a process for supplying a first welding current (I1) to the folded plate 215a and the winding 120 through one pair of the welding heads (WH1, WH2).

After the stator 310 is wound with the winding 120 on the surface of the winding 120, a non-conductive covering may be formed to insulate between the windings 120. Therefore, it may be necessary or desirable to remove the covering of the winding 120 to electrically couple the winding 120 to the folded plate 215a.

In addition, the welding process 120 may include a process for supplying a second welding current (I2) to the folded plate 215a and the winding 120 through a pair of welding heads (WH1, WH2) so as to weld the winding 120 to the folded plate 215a, as shown in FIG. 14(b).

In order to fix the winding 120 to the folded plate 215a as well as to minimize electrical resistance between the winding 120 and the folded plate 215a, it may be necessary or desirable for the winding 120 to be fused to the folded plate 215a.

Figure 15:
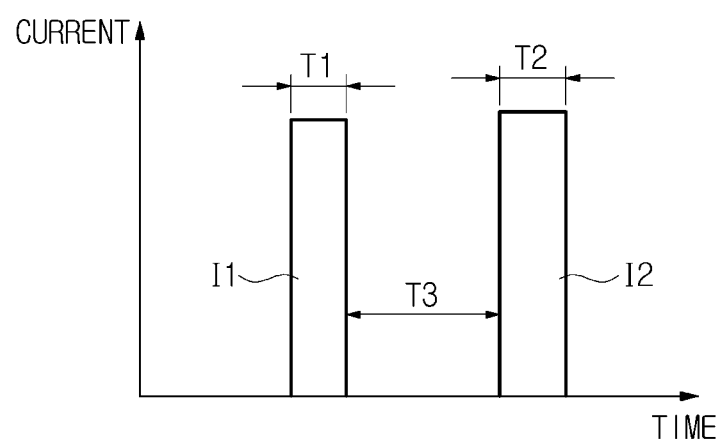
FIG. 15 shows the profile of a supply current during the welding process of FIG. 14.

FIG. 15 shows the profile of a supply current during the welding process of FIG. 14.

Referring to FIG. 15, the first welding current (I1) and the second welding current I2) may have pulse shapes as shown in FIG. 15.

The first welding current (I1) may be supplied during a first welding time T1, and the second welding current (I2) may be supplied during a second welding time T2. In addition, supply of the welding currents may stop between the first welding current (I1) and the second welding current (I2) during a standby time T3.

The covering of the winding 120 may be formed of a non-conductive rubber or plastic material, and a melting point may be low so that the covering of the winding 120 may be removed by a relative heat quantity. In addition, the winding 120 of the folded plate 215a may be formed of conductive metal, so that a relatively high heat capacity may be needed to fuse the winding 120 onto the folded plate 215a.

Due to the above-mentioned reasons, the second welding current (I2) may be larger in magnitude than the first welding current (I1), and the first welding time T1 may be longer than the second welding time T2.

However, the first welding current (I1) and the second welding current (I2) are not limited thereto. For example, the first welding current (I1) and the second welding current (I2) may be identical to each other, and the first welding time T1 may be identical to the second welding time T2.

In addition, the first welding current (I1) may be identical to the second welding current (I2), and the second welding time T2 may be longer than the first welding time T1. Any of the other combinations of magnitudes and times with respect to the welding currents and welding times are also possible. For example, the first welding current (I1) may be smaller in magnitude than the second welding current (I2), and the second welding time T2 may be longer than the first welding time T1, the first welding current (I1) may be smaller in magnitude than the second welding current (I2), and the second welding time T2 may be shorter than the first welding time T1, the first welding current (I1) may be smaller in magnitude than the second welding current (I2), and the second welding time T2 may be equal to the first welding time T1, and so on.

By the compression process 1010 and the welding process 1020, the winding 120 of the stator assembly 300 may be coupled to the winding coupling unit 215 of the busbar assembly 200 by minimum electrical resistance.

Figure 16:
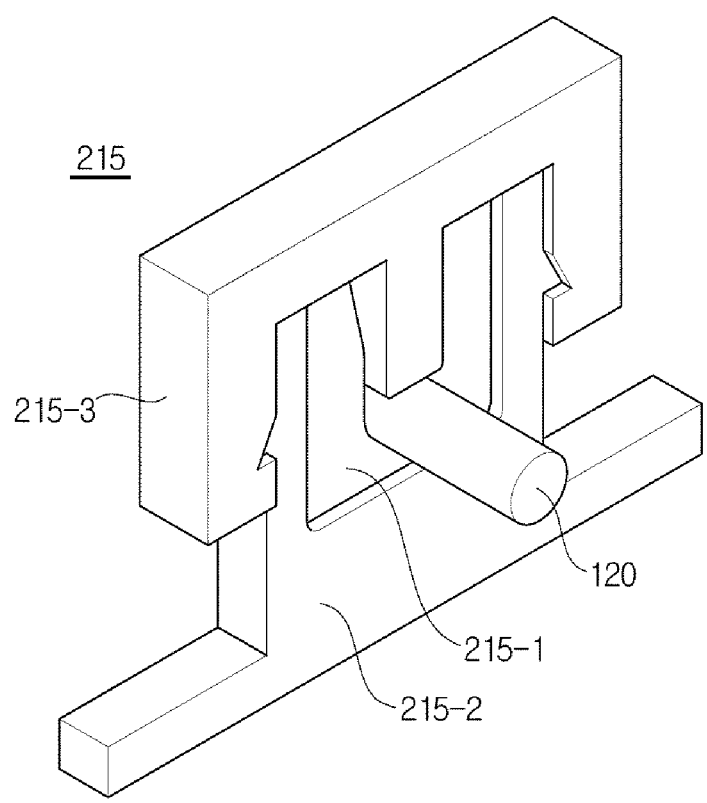
FIG. 16 shows another application example of the winding coupling unit contained in the motor according to an exemplary embodiment.

FIG. 16 shows an example of the winding coupling unit contained in the motor according to an exemplary embodiment.

Referring to FIG. 16, the winding coupling unit 215 according to an example of the disclosure may include a winding stripper 215-1 for contacting the winding 120 by peeling off the covering of the winding 120, a support body 215-2 for supporting the winding stripper 215-a, and a winding fixing member 215-3 for fixing the winding 120 to the winding stripper 215-1.

If the winding 120 is inserted into the winding stripper 215-1, the covering of the winding 120 is peeled off by an inner protrusion of the winding stripper 215-1, so that the winding 120 may directly contact the winding stripper 215-1.

In accordance with an example of the winding coupling unit 215, an additional process for fusing the winding 120 onto the winding coupling unit 215 is no longer required.

A method for manufacturing the motor 100 and the busbar assembly 200 according to an embodiment of the disclosure will hereinafter be described in detail.

The busbar assembly 200 may be fabricated by an insert injection scheme and an assembling scheme.

In accordance with the insert injection scheme, a metal busbar group 210 having conductivity may be fabricated. Thereafter, the busbar group 210 may be inserted into an injection molding device (not shown) designed to manufacture the busbar housing 220 and the busbar housing cover 230, so that the insert injection molding is carried out.

The busbar assembly 200 fabricated by the insert injection scheme may be fixed to the stator assembly 300 using the stator hook bar 226 (See FIG. 5) and the hook engaging unit 326 (See FIG. 8).

Thereafter, the winding 120 (See FIG. 10) of the stator assembly 300 may be coupled to the winding coupling unit 215 (See FIG. 5) of the busbar assembly 200.

In accordance with the assembling scheme, the metal busbar group 210 having conductivity, the busbar housing 220 having non-conductivity, and the busbar housing cover 230 are fabricated. Thereafter, the busbar group 210 may be seated in the busbar housing 220, and the busbar housing cover 230 may be coupled to the busbar housing 220.

As described above, the busbar assembly 200 fabricated by the assembling scheme may be fixed to the stator assembly 300 using the stator hook bar 226 (See FIG. 5) and the hook engaging part 326 (See FIG. 8), and the winding 120 (See FIG. 1) of the stator assembly 300 may be coupled to the winding coupling unit 215 (See FIG. 5) of the busbar assembly 200.

As described above, the stator based on the parallel winding scheme and the busbar assembly contained in the stator have been disclosed.

The stator based on the serial winding scheme and the busbar assembly contained in the stator according to an embodiment of the disclosure will hereinafter be described in detail.

Figure 17:
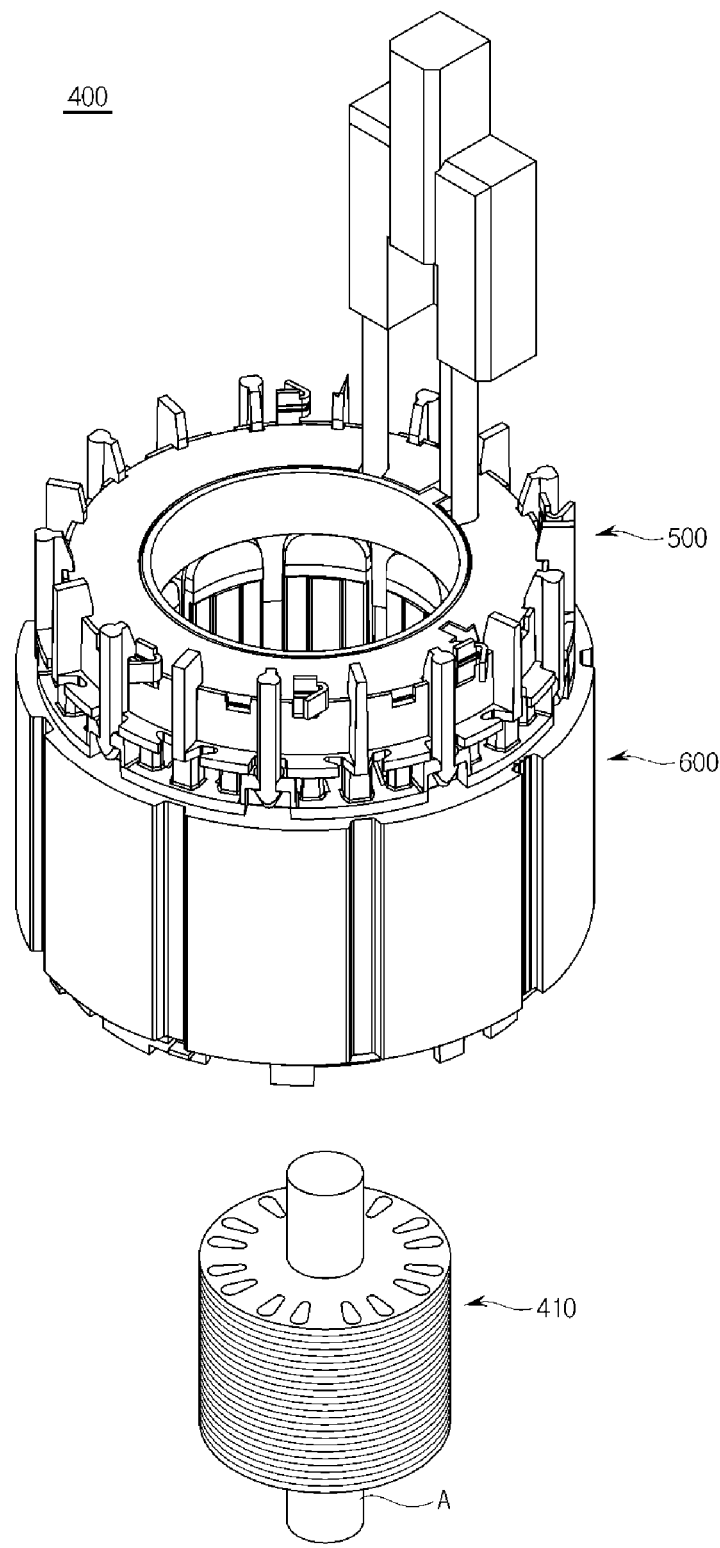
FIG. 17 is a structural view illustrating the motor according to an embodiment.
Figure 18:
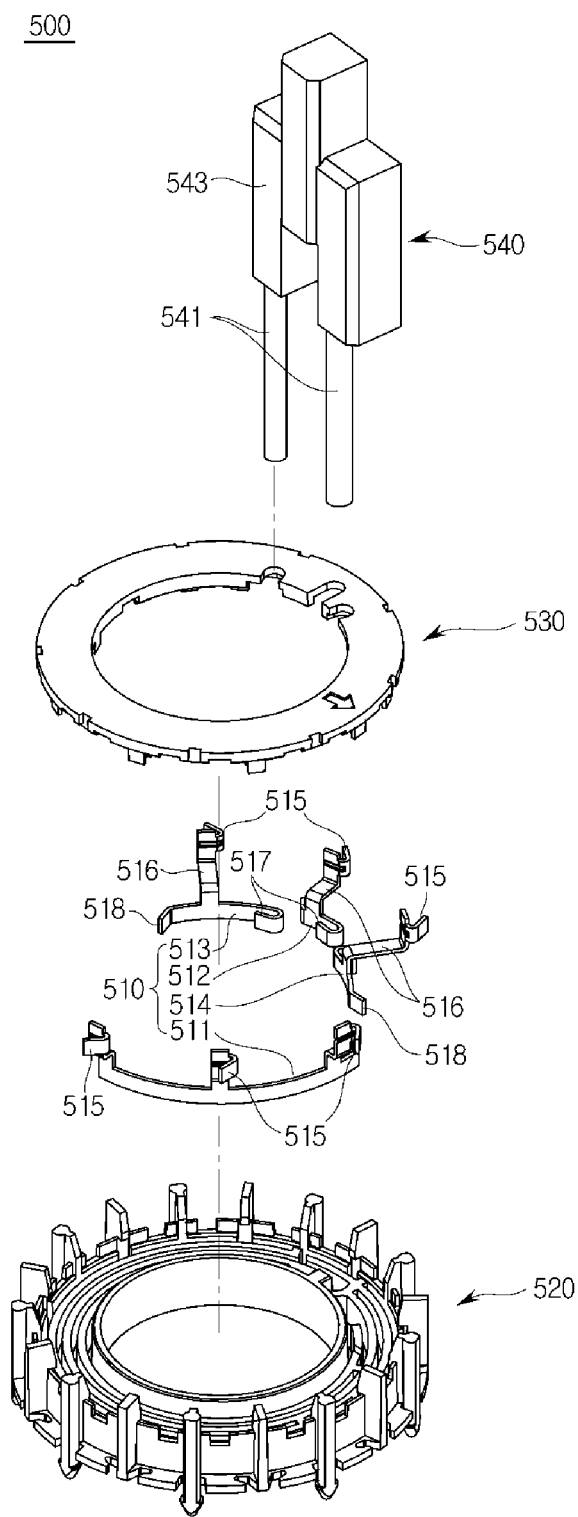
FIG. 18 is a structural view illustrating the busbar assembly contained in the motor according to an embodiment.
Figure 19:
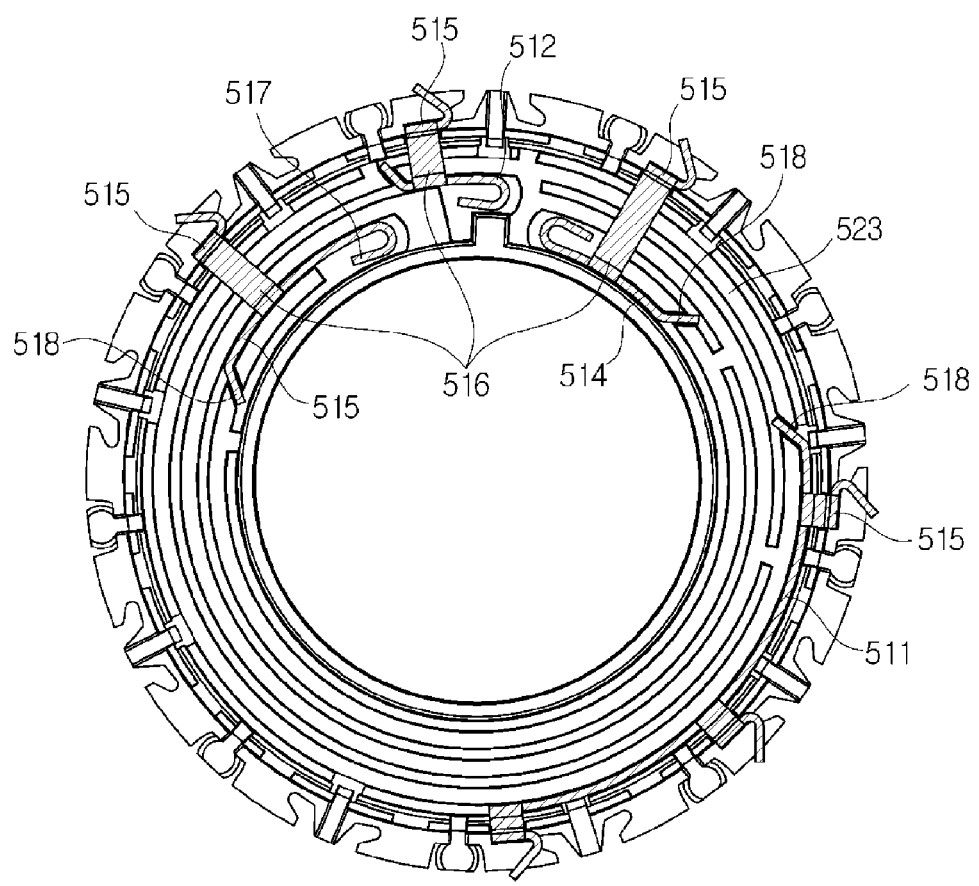
FIG. 19 shows the appearance of the motor's busbar seated in the busbar housing according to an exemplary embodiment.

FIG. 17 is a structural view illustrating the motor according to an embodiment. FIG. 18 is a structural view illustrating the busbar assembly contained in the motor according to an embodiment. FIG. 19 shows the appearance of the motor's busbar seated in the busbar housing according to an exemplary embodiment.

Referring to FIGS. 17 and 18, the motor 400 may include a rotor 410 and stators (500, 600). The stators (500, 600) may include a busbar assembly 500 and a stator assembly 600. The motor 400 may include the rotor 410, the stator assembly 600, and the busbar assembly 500. The stator assembly 600 may be identical to the stator assembly 300 (See FIG. 4) of the motor 100 (See FIG. 4), and as such a detailed description thereof will herein be omitted for convenience of description and better understanding of the disclosure.

The busbar assembly 500 may include a busbar terminal 540, a busbar group 510, a busbar housing 520, and a busbar housing cover 530. The busbar terminal 540, the busbar housing 520, and the busbar housing cover 530 may be identical to the busbar terminal 240 (See FIG. 5) of the motor 100 (See FIG. 4), the busbar housing 220 (See FIG. 5), and the busbar housing cover 230 (See FIG. 5), and as such a detailed description thereof will herein be omitted for convenience of description and better understanding of the disclosure. For example, the busbar terminal 540 may include a lead wire 541 for extending the coil contained in the stator assembly 600 to the outside, and a terminal coupling terminal 543 coupled to an external driving circuit (not shown).

The busbar group 510 may include first, second, third, and fourth busbars (511, 512, 513, 514) having a plurality of circular arcs as shown in FIG. 18. The busbars (511, 512, 513, 514) may be formed of a conductive metal material. In order to allow the busbars (511, 512, 513, 514) to easily make an arc shape, the axial directional width of the concentric circle may be larger than the width of a radial direction of the concentric circle.

In addition, the respective busbars (511, 512, 513, 514) may include a winding coupling unit 515 connected to the winding, a busbar extending unit 516 for extending the winding coupling unit 515 from each busbar (511, 512, 513, 514) to the outer circumference of the busbar housing 520, and a terminal coupling unit 517 for coupling each busbar (511, 512, 513, 514) to the busbar terminal 410.

In accordance with the serial winding scheme, the windings having the same phases (U-phase, V-phase, W-phase) may be incorporated into the stator assembly 600. As a result, three windings in which a common point between each of U-phase, V-phase, and W-phase and a single winding is formed may be exposed to the outside of the stator assembly 600.

As a result, the first busbar 511 forming a common point may include a plurality of winding coupling units (e.g., three winding coupling units 515), and each of the second, third, and fourth busbars (512, 513, 514) forming U-phase, V-phase, and W-phase may include at least one coupling unit (e.g., a single winding coupling unit 515). For example, as shown in FIG. 19, six winding coupling units are disposed circumferentially about the busbar group 510. For example, as shown in FIG. 19 three winding coupling units among the six winding coupling units are disposed sequentially adjacent to one another and may correspond to the first busbar 511. For example, as shown in FIG. 19, three winding coupling units among the six winding coupling units may be disposed sequentially adjacent to one another circumferentially about the busbar group, and may correspond to winding coupling units of the second, third and fourth busbars (512, 513, 514). For example, a winding coupling unit corresponding to the second busbar 512 and may be disposed between winding coupling units corresponding to the third busbar 513 and the fourth busbar 514.

In addition, the busbar fixing unit 518 may be provided at one end of each busbar (511, 512, 513, 514). In the busbar fixing unit 518, one end of each busbar (511, 512, 513, 514) may be curved so that the respective busbars (511, 512, 513, 514) may be fixed to the busbar housing 520.

In comparison between FIG. 5 and FIG. 18, it may be recognized that the busbars (511, 512, 513, 514) contained in the motor 400 of the serial winding scheme are shorter in length than the busbars (211, 212, 213, 214) (See FIG. 5) contained in the motor 100 (See FIG. 4) of the parallel winding scheme.

In contrast, the busbar housing 520 in which the busbar group 510 is seated may have the same structure as in the busbar housing 220 (See FIG. 5) of the parallel winding scheme. Due to the above-mentioned reason, the busbar fixing unit 518 may be provided to fix the busbars (511, 512, 513, 514) of the serial winding scheme to the busbar housing 520.

Referring to FIG. 19, the ring-shaped barrier 523 may be installed in the busbar housing 520 to insulate the respective busbars (511, 512, 513, 514) may include a fixed groove located at a specific location corresponding to the busbar fixing unit 518 contained in the respective busbars (511, 512, 513, 514).

The busbar fixing unit 518 may be inserted into the fixed groove, so that the busbars (511, 512, 513, 514) may be fixed to the inside of the housing.

The outer-type busbar assembly for fixing the winding to the outer circumference of the busbar assembly has been disclosed above.

The inner-type busbar assembly for fixing the winding to the inner circumference of the busbar assembly will hereinafter be described in detail.

Figure 20:
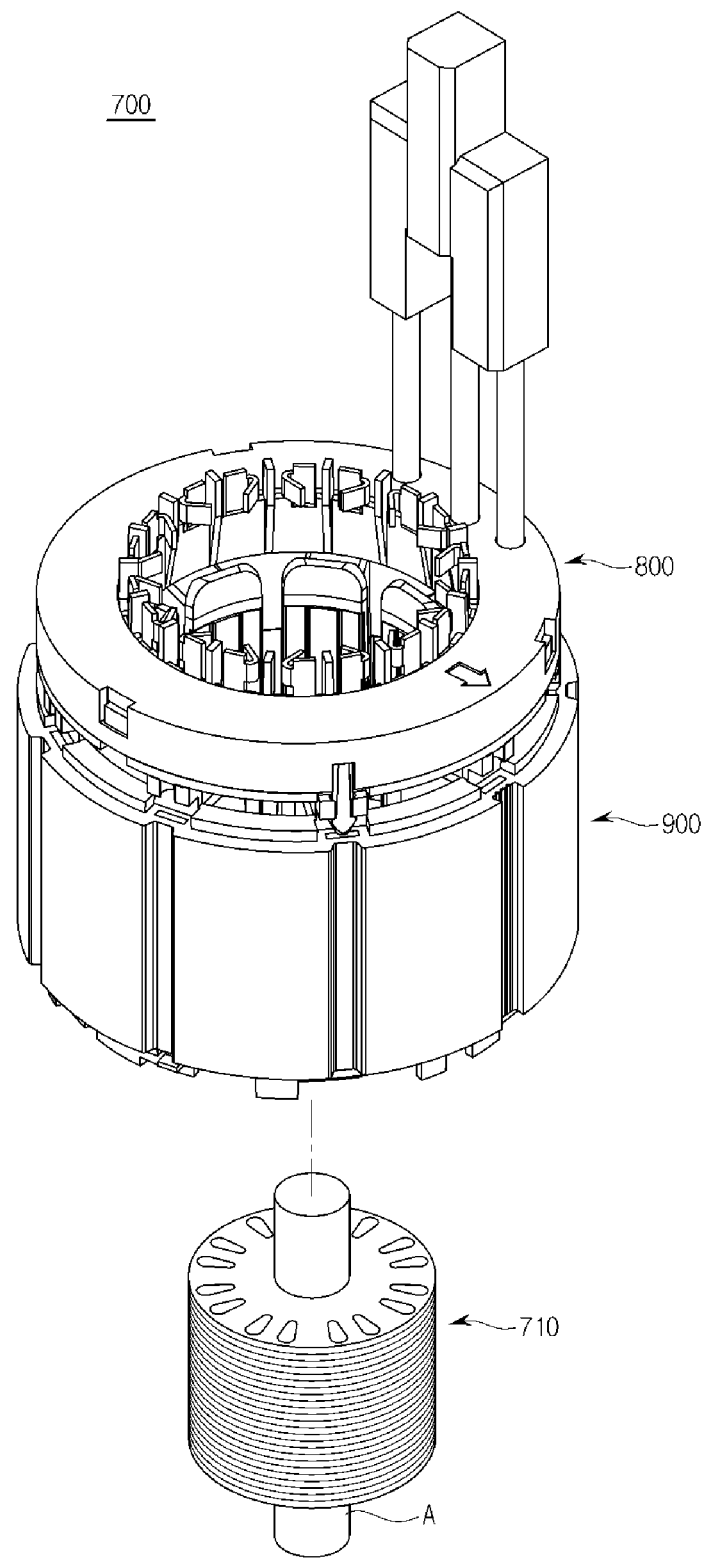
FIG. 20 is a structural view illustrating the motor according to an embodiment.
Figure 21:
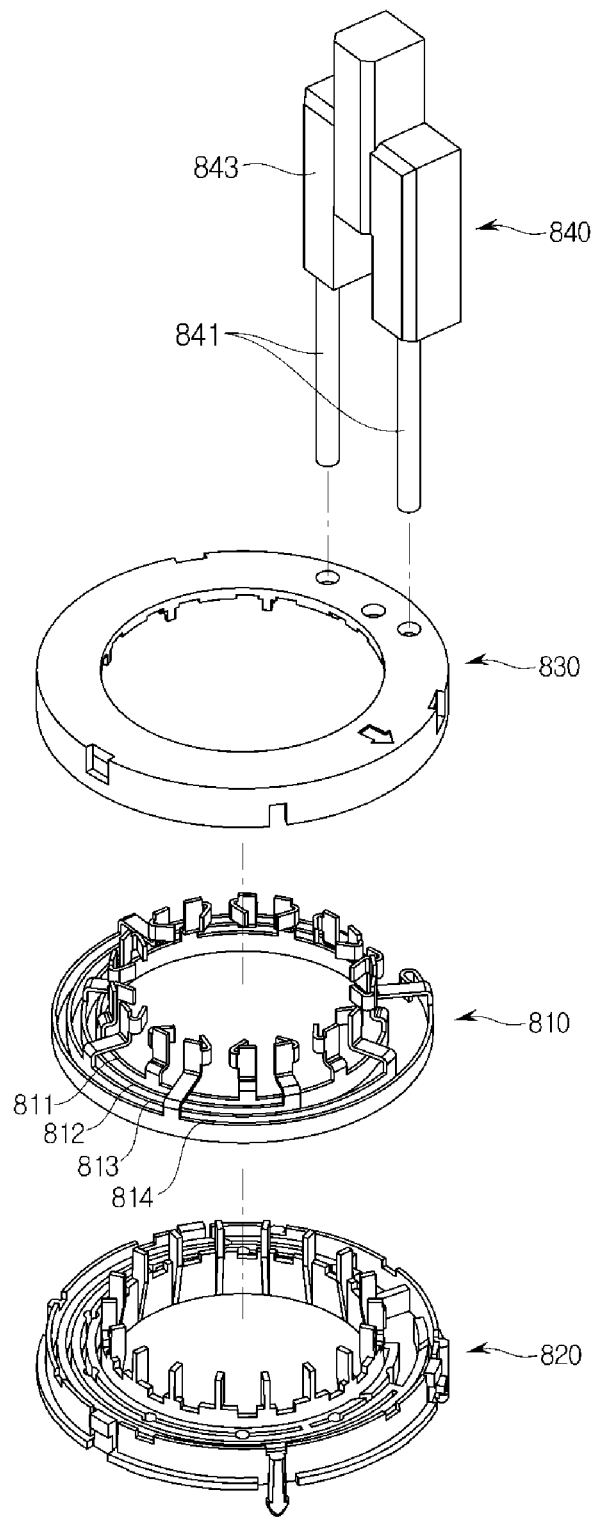
FIG. 21 is a structural view illustrating the busbar assembly contained in the motor according to an embodiment.
Figure 22:
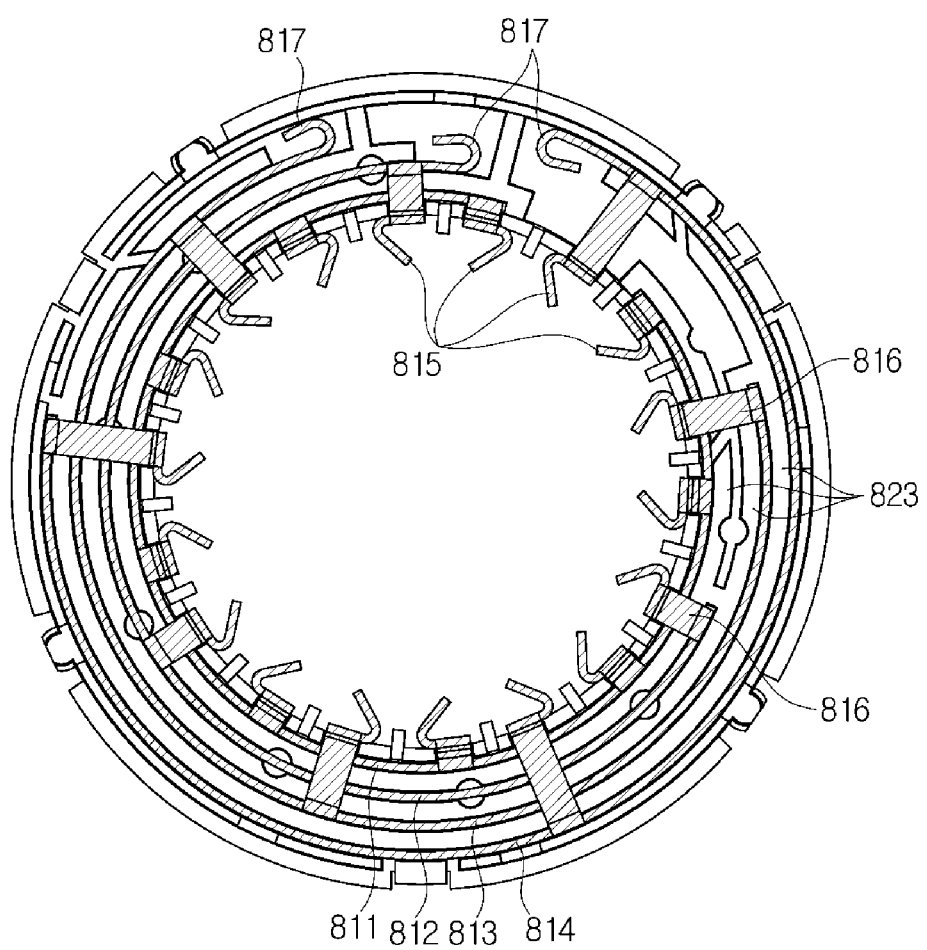
FIG. 22 shows the appearance of the motor's busbar seated in the busbar housing according to an embodiment.

FIG. 20 is a structural view illustrating a motor according to an embodiment of the disclosure. FIG. 21 is a structural view illustrating the busbar assembly contained in the motor according to an embodiment. FIG. 22 shows the appearance of the motor's busbar seated in the busbar housing according to an embodiment.

Referring to FIGS. 20 to 22, the motor 700 may include a rotor 710 and stators (800, 900). The stators (800, 900) may include a busbar assembly 800 and a stator assembly 900. The motor 700 may include the rotor 710, the stator assembly 900, and the busbar assembly 800.

As shown in FIG. 21, the busbar assembly 800 may include a busbar terminal 840 for connecting the motor 700 to the external driving circuit, a busbar group 810 for arranging the windings of the stator assembly 900, a busbar housing 820 for accommodating the busbar group 810 therein, and a busbar housing cover 830 for closing an opened top surface of the busbar housing 820. The busbar terminal 840, the busbar housing 820, and the busbar housing cover 830 may be identical or similar to the busbar terminal 240 (See FIG. 5) of the motor 100 (See FIG. 4), the busbar housing 220 (See FIG. 5), and the busbar housing cover 230 (See FIG. 5), and as such a detailed description thereof will herein be omitted for convenience of description and better understanding of the disclosure.

The busbar terminal 840 may extend the coil contained in the stator assembly to the outside so that the motor 700 is electrically connected to the external driving circuit (not shown). For example, the busbar terminal 840 may include a lead wire 841 for extending the coil contained in the stator assembly 900 to the outside, and a terminal coupling terminal 843 coupled to an external driving circuit (not shown).

The busbar group 810 may include first, second, third, and fourth busbars (811, 812, 813, 814) having a plurality of circular arc shapes.

The busbars (811, 812, 813, 814) may include the winding coupling unit 815 connected to the winding of the stator assembly 900, the busbar extending unit 816 for extending the winding coupling unit 815 from each busbar (811, 812, 813, 814) to the inner circumference of the busbar housing 820, and a terminal coupling unit 817 for coupling each busbar (811, 812, 813, 814) to the busbar terminal 710.

The winding coupling unit 815 may be extended from each busbar (811, 812, 813, 814) in the radial direction by the busbar extending unit 816, so that the winding coupling unit 815 may be installed in the busbar housing 820.

In the terminal coupling unit 817, one end of each busbar (811, 812, 813, 814) may be curved in the radial direction, so that the terminal coupling unit 817 may be coupled to the busbar terminal 840.

The first busbar 811 may have an arc shape of the circle having a first radius, and may be installed at the innermost part of the busbar group 810. In addition, the first busbar 811 may form a common point of the windings, may include a plurality of winding coupling units (e.g., 6 or more winding coupling units 815), and may not include the terminal coupling unit 817.

The second, third, and fourth busbars (812, 813, 814) have an arc of the circle having a second radius, an arc of the circle having a third radius, and an arc of the circle having a fourth radius, respectively. The busbars may be arranged in the order of the second busbar 812→the third busbar 813→the fourth busbar 814 from the inside of the busbar group 810 toward an outside of the busbar group 810, so that the fourth busbar 814 is arranged at the outermost part of the busbar group 810. For example, as shown in FIG. 22, every other winding coupling unit among the 18 winding coupling units which are disposed circumferentially about an inner portion of the busbar group 810, may correspond to a winding coupling unit included in the first busbar 811. For example, as shown in FIG. 22, every other winding coupling unit among the 18 winding coupling units which are disposed circumferentially about an inner portion of the busbar group 810, may correspond to one of the winding coupling units included in the second, third and fourth busbars (812, 813, 814). For example, as shown in FIG. 22, every other winding coupling unit among the 18 winding coupling units which are disposed circumferentially about an inner portion of the busbar group 810, may alternate between one of the second, third and fourth busbars (812, 813, 814). That is, if the even-number winding coupling units correspond to winding coupling units of the second, third and fourth busbars (812, 813, 814), the second winding coupling unit may correspond to the second busbar 812, the fourth winding coupling unit may correspond to the third busbar 813, and the sixth winding coupling unit may correspond to the fourth busbar 814, and so on. Thus, each of the second, third and fourth busbars (812, 813, 814) may include three winding coupling units. Meanwhile, the odd numbered winding coupling units among the 18 winding coupling units may correspond to the first busbar 811.

The second, third, and fourth busbars (812, 813, 814) may form a U-phase, a V-phase, and a W-phase, respectively, and may include at least one winding coupling unit 815 and at least one terminal coupling unit 817.

As shown in FIG. 21, the busbar housing 820 may have a cylindrical shape having a hollow as shown in FIG. 21, and may include the busbar group 810 therein. The busbar housing 820 may be formed of a non-conductive material to insulate between the respective busbars (811, 812, 813, 814).

In addition, the busbar housing 820 may include a ring-shaped barrier 823 for isolating the respective busbars (811, 812, 813, 814), and the first, second, third, and fourth busbars (811, 812, 813, 814) may be mutually insulated by the ring-shaped barrier 823.

As shown in FIG. 21, the busbar housing cover 830 may have a ring-shaped structure having a hollow, and may be formed of a non-conductive material which is similar to or the same as a non-conductive material forming the busbar housing 820. However, the disclosure is not so limited and the busbar housing cover 830 and busbar housing 820 may be formed of different non-conductive materials.

The stator assembly 300 and the rotor 110, and the coupling structure of the stator assembly 300 have been disclosed above.

The shapes of the stator assembly 300 and the rotor 110 to minimize noise and vibration will hereinafter be described in detail.

Figure 23:
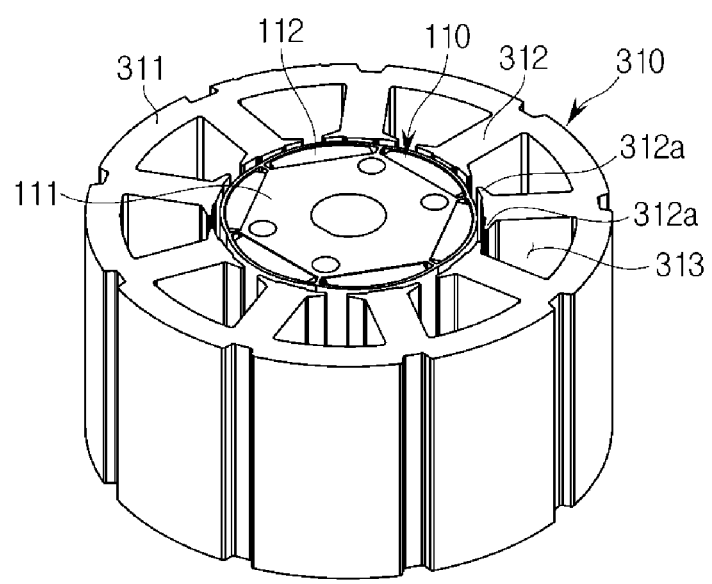
FIG. 23 is a structural view illustrating a rotor and a stator contained in the motor according to an exemplary embodiment.

FIG. 23 is a structural view illustrating the rotor and the stator contained in the motor according to an exemplary embodiment.

The stator assembly 300 contained in the motor 100 (See FIG. 4) shown in FIG. 4, the stator assembly 600 contained in the motor 400 (See FIG. 17) shown in FIG. 17, and the stator assembly 900 contained in the motor 700 (See FIG. 20) shown in FIG. 20 have different shapes of the upper insulator, whereas they have the same shapes of the stator.

Although the rotor 110 and the stator 310 contained in the motor 100 (See FIG. 4) have been disclosed above, the rotor 110 and the stator 310 may also be applied to the motors (400, 700) shown in FIGS. 17 and 20 without change.

As described above, the motor 100 may include the rotor 110 and the stator assembly 300, and the stator assembly 300 may include the stator 310, the upper insulator 320 (See FIG. 8), and the lower insulator 330 (See FIG. 8).

However, the upper insulator 320 (See FIG. 8) and the lower insulator 330 (See FIG. 8) may less affect the operations of the motor 100, and as such a detailed description thereof will herein be omitted, and the stator 310 will hereinafter be described in detail.

Figure 24:
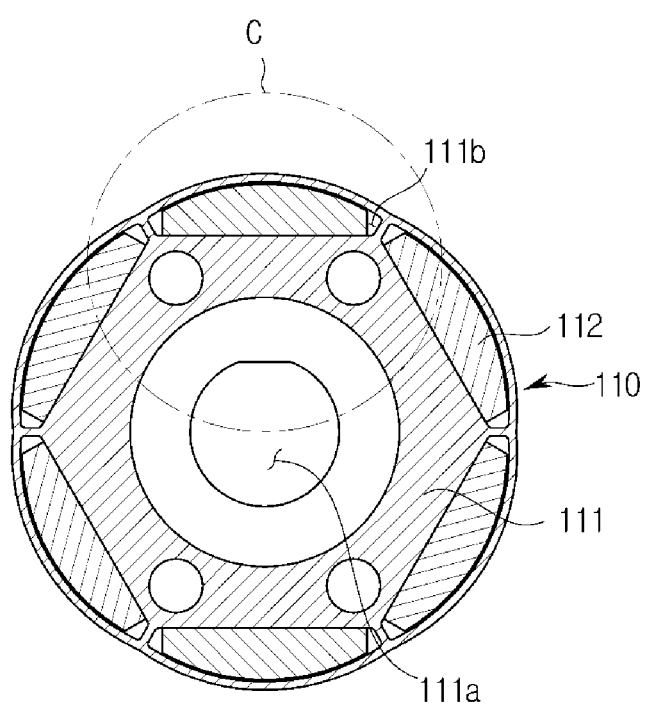
FIG. 24 is a cross-sectional view illustrating the rotor of FIG. 23.
Figure 25:
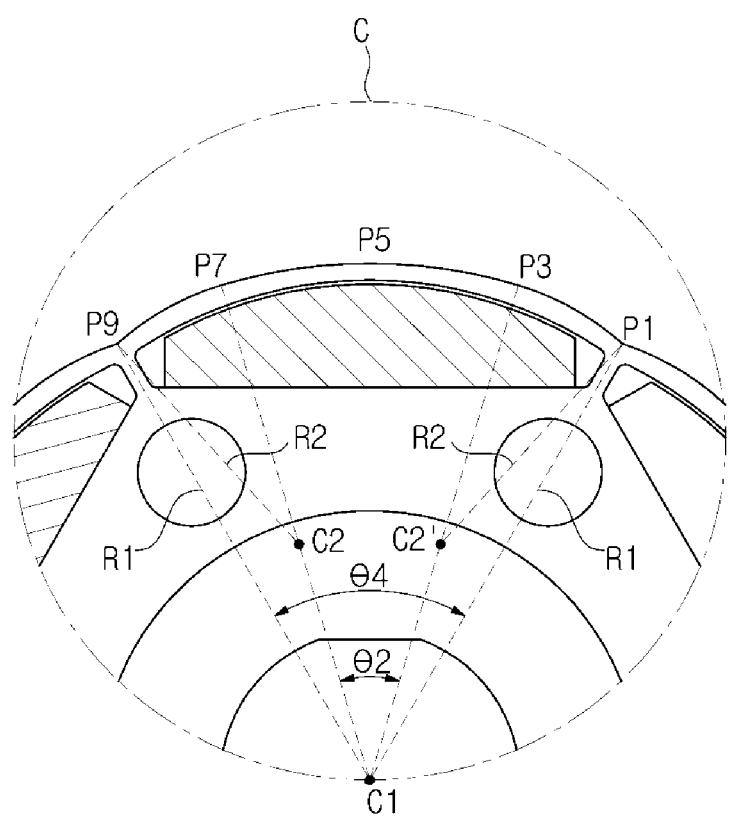
FIG. 25 is an enlarged view illustrating a region C of FIG. 24.

FIG. 24 is a cross-sectional view illustrating the rotor of FIG. 23. FIG. 25 is an enlarged view illustrating a region C of FIG. 24.

Referring to FIG. 24, the rotor 110 may include a permanent magnet 112 for generating a magnetic field and a rotor body 111 for accommodating the permanent magnet 112 therein.

The rotor body 111 may have a cylindrical shape, and the rotation-axis hole 111a in which the rotation axis may be inserted is located at the center part of the rotor body 111.

In addition, the permanent magnet hole 111b in which the permanent magnet 112 is inserted may be formed at the edge of the rotor body 111. The permanent magnet holes 111b may be arranged along the circumferential direction of the rotor body 111 at equal (regular) intervals. Alternatively, the permanent magnet holes 111b may be arranged along the circumferential direction of the rotor body 111 at irregular intervals.

For example, as shown in FIG. 24, the rotor body 111 may include 6 permanent magnet holes 111b. However, the number of permanent magnet holes is not limited thereto, and even-numbered permanent magnet holes 111b such as 4, 8, or 10 permanent magnet holes may be formed.

In addition, the rotor body 111 may be formed of a magnetic material capable of being magnetized by a magnetic field. For example, the rotor body 111 may be formed by stacking a plurality of metal plates in the direction of the rotation axis.

The permanent magnet 112 may be inserted into the permanent magnet hole 111b formed in the rotor body 111, and the same number of permanent magnets 112 as in the number of permanent magnet holes 111b may be provided. In addition, the outer appearance of the permanent magnet 112 may have a convexly curved shape.

The permanent magnet 112 may be arranged in a manner that an N pole and an S pole alternately appear along the circumference of the rotor 110.

For example, if any one of the permanent magnets is arranged in a manner that the N pole faces the radial direction of the rotor 110, a permanent magnet neighboring with this permanent magnet is arranged in a manner that the S pole faces the radial direction of the rotor 110. In addition, if any one of the permanent magnets is arranged in a manner that the S pole faces the radial direction of the rotor 110, the permanent magnet neighboring with this permanent magnet may be arranged in a manner that the N pole faces the radial direction of the rotor 110.

As described above, the rotor 110 may be arranged in a manner that an N pole and an S pole alternately appear along the circumferential direction according to arrangement of the permanent magnet 112. A specific part indicating N pole or S pole may be denoted by one pole. In other words, a specific part indicating the same pole (N pole or S pole) along the circumferential direction of the rotor 110 may be used as one rotor pole.

In addition, the number of rotor poles may be identical to the number of permanent magnets 112. For example, if the rotor 110 includes 6 permanent magnets 112 as shown in FIG. 24, the rotor 110 may include 6 rotor poles.

In addition, an angle ($\theta 4$) between both ends of the rotor poles on the basis of the rotation axis C1 may correspond to about 60 degrees on the basis of the rotation axis of the rotor 110.

In the case of the rotor 110, the center part of the rotor poles may have a convexly curved shape, and the edge part of the rotor poles may have a concaved shape.

In more detail, a radius of curvature of the center part of the central pole of the outer circumference of the rotor 110 may be different from that of the edge part of the pole. The radius of curvature of the center part of the pole may be longer than that of the edge part of the pole.

For example, as shown in FIG. 25, the outer circumference of the rotor 110 has a first curvature radius R1 within a predetermined central angle range ($\theta 2$) from the center point of the rotor poles, and the outer circumference of a specific part deviating from a central angle range ($\theta 2$) of the rotor poles may have a second curvature radius R2. In addition, the first curvature radius R1 may be longer than the second curvature radius R2.

In addition, the outer circumference of the central angle range ($\theta 2$) of the rotor poles may have a first curvature center C1, and the outer circumference of a specific part deviating from the central angle range ($\theta 2$) of the rotor poles may have a second curvature center C2. In addition, the first curvature center C1 may be identical to a rotation center of the rotor 110, and the second curvature center C2 may be different from the rotation center of the rotor 110.

In more detail, the outer circumference from a first point P1 corresponding to the left edge of the rotor poles to a third point P3 may have a second curvature radius R2 and a second curvature center C2', and the outer circumference from a third point P3 corresponding to the center part of the rotor poles to a seventh point P7 may have a first curvature radius R1 and a first curvature center C1. The outer circumference from the seventh point P7 corresponding to the right edge of the rotor poles to the $9^{th}$ point P9 may have a second curvature radius R2 and a second curvature center C2.

In addition, the first curvature center C1 may correspond to the rotation axis of the rotor 110, and the first curvature radius R1 may be longer than the second curvature radius R2.

In another example, the curvature radius of the rotor 110's circumference ranging from the center part of the rotor poles to the edge part of the rotor poles may be stepwisely (discontinuously) reduced, or may be gradually (continuously) reduced.

The outer circumference of the center part of the rotor poles and the outer circumference of the edge part of the rotor poles may have different radiuses of curvature, so that the center part of the rotor pole of the rotor 110 may have a convexly curved shape and the edge part of the rotor pole may have a concaved shape.

Figure 26:
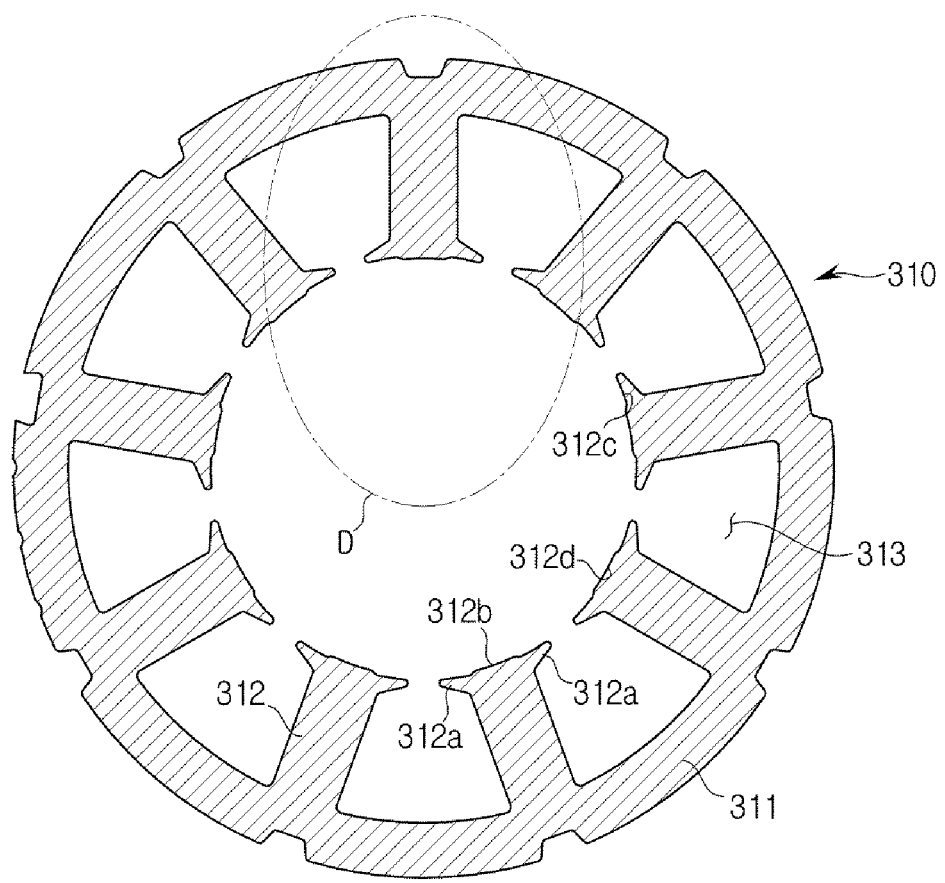
FIG. 26 is a cross-sectional view illustrating the stator of FIG. 23.
Figure 27:
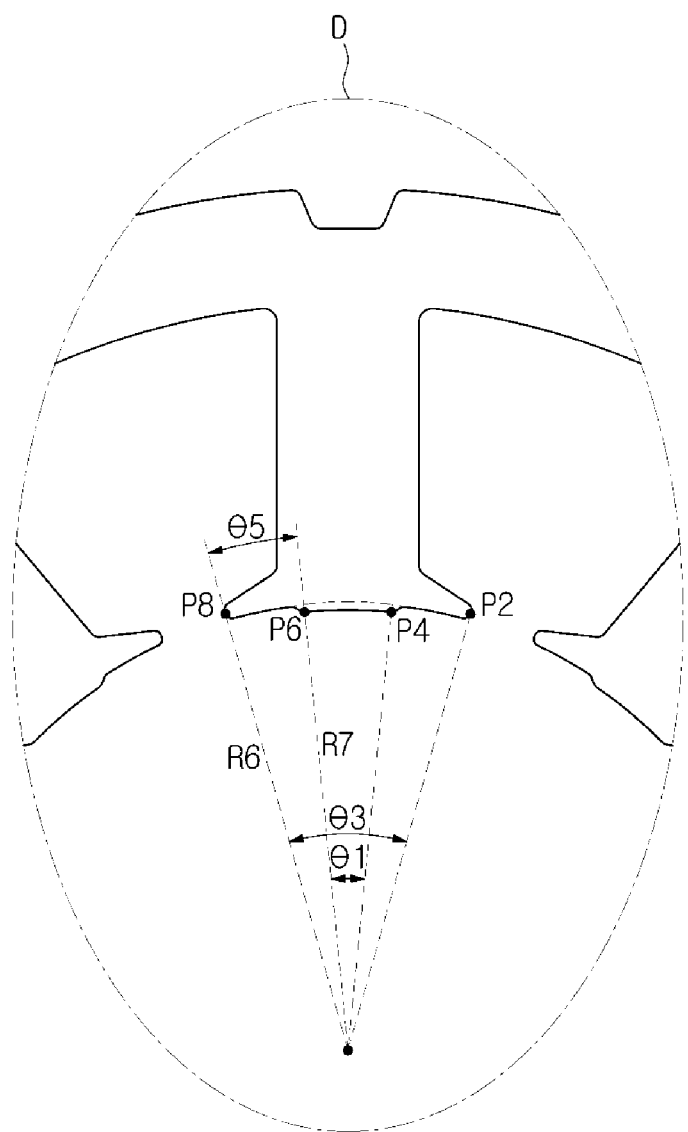
FIG. 27 is an enlarged view illustrating a region D of FIG. 26.

FIG. 26 is a cross-sectional view illustrating the stator of FIG. 23. FIG. 27 is an enlarged view illustrating a region D of FIG. 26.

Referring to FIG. 26, the stator 310 may include a cylindrical stator body 311 having a hollow, and teeth 312 protruded inward from the inner circumference of the stator body 311. In addition, a slot 313 is formed between the neighboring teeth 312.

The stator body 311 may have a cylindrical shape, the teeth 312 is formed at the center part of the stator body 311, and a hollow in which the rotor 110 is inserted is formed.

The teeth 312 may be formed to protrude from the inner circumference of the stator body 311 toward the center point of the stator body 311, and may be arranged along the inner circumference of the stator body 311 at equal (regular) intervals. Alternatively, the teeth 312 may be arranged along the inner circumference of the stator body 311 at irregular intervals.

For example, as shown in FIG. 26, 9 teeth 312 may be formed in the stator body 311. However, the number of the teeth 312 is not limited thereto, and 3, 6, or 12 teeth 312 may be formed, for example.

In addition, a teeth shoe 312a may protrude in both circumferential directions and may be formed at the end of the teeth 312. Due to the teeth shoe 312a, the width of the end of the teeth 312 becomes larger than the width of a body part of the teeth 312.

In other words, an angle (θ3) between both ends of the teeth shoe 312a is larger than an angle between both ends of the teeth 312, and the area of the teeth 312 facing the rotor 110 becomes larger in size.

In addition, the inner circumference 312c of the end of the teeth 312 may be formed in a manner that the curvature center is identical to the center of the stator body 311. In other words, if the inner circumference 312c of the end of the teeth 312 is extended, the stator body 311 and the concentric circle may be formed.

As shown in FIG. 27, a teeth protrusion 312b may protrude in the radial direction of the stator 310 and may be formed at the end of the teeth 312.

The inner circumference 312d of the teeth protrusion 312b may be formed in a manner that the curvature center of the inner circumference 312d is identical to the center point of the stator body 311. That is, the inner circumference 312c of the end of the teeth 312 and the inner circumference 312d of the teeth protrusion 321b may be formed to have the same curvature center.

However, the inner circumference 312c of the end of the teeth 312 and the inner circumference 312d of the teeth protrusion 312b are not limited thereto, and the inner circumference 312d of the teeth protrusion 312b and the inner circumference 312c of the end of the teeth 312 may have different curvature center points.

An angle (θ1) between both ends (P4~P6) of the teeth protrusion 312b on the basis of the rotation axis C1 is less than an angle (θ3) between both ends (P2~P8) of the end of the teeth 312. As shown in FIG. 27, a curvature radius R6 extending from the rotation axis C1 to an end of the teeth at point P8 may be equal to or longer than a curvature radius R7 extending from the rotation axis C1 to the teeth protrusion 312b at point P6.

In addition, the angle (θ1) between both ends (P4~P6) of the teeth protrusion 312b of the teeth protrusion 312b on the basis of the rotation axis C1 may be higher than (greater than) an angle (θ5) between one end (P4 or P6) of the teeth protrusion 312b and the other end (P2 or P8) of the end of the teeth 312. Alternatively, the angle (θ1) may be less than or equal to the angle (θ5).

The stator body 311 and the teeth 312 may be incorporated to form the stator 310, and may be formed of a magnetic material capable of being magnetized by a magnetic field. For example, the stator 310 may be formed by stacking metal plates having shapes of the stator body 311 and the teeth 312 in a direction of the rotation axis.

Figure 28:
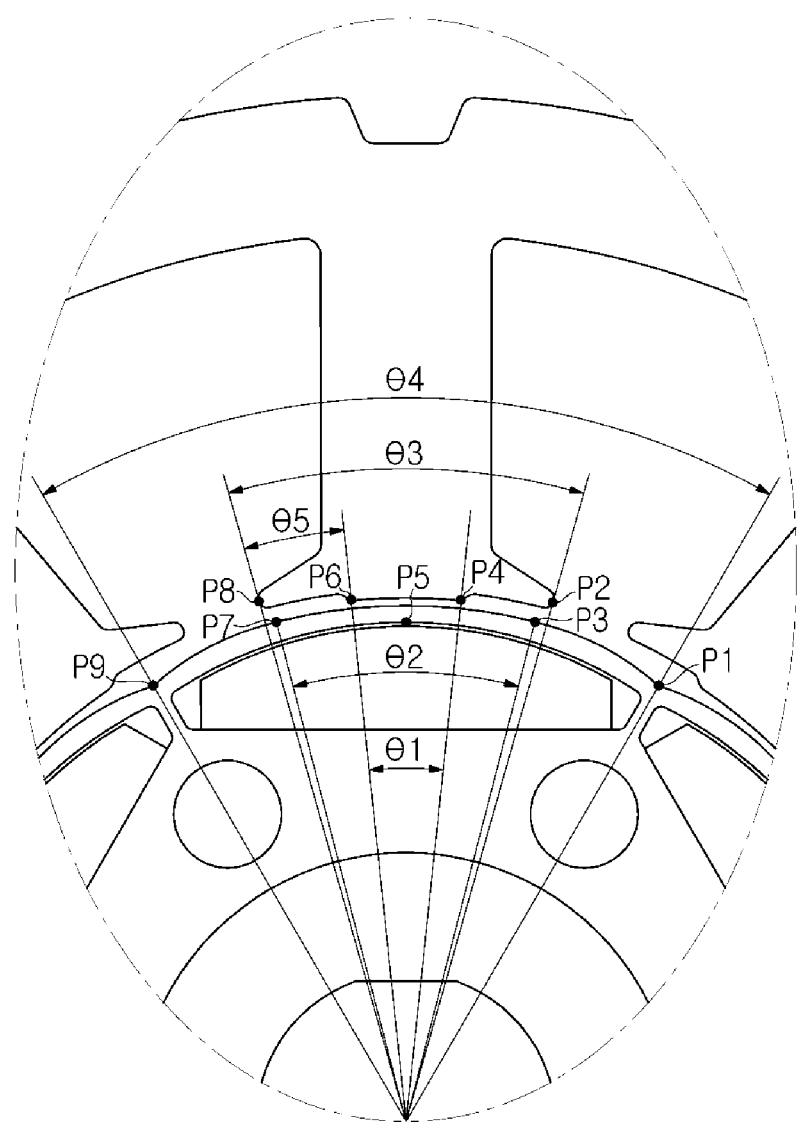
FIG. 28 is a cross-sectional view illustrating a rotor and a stator contained in the motor according to an exemplary embodiment.

FIG. 28 is a cross-sectional view illustrating the rotor and the stator contained in the motor according to an exemplary embodiment.

Referring to FIG. 28, the relationship between the rotor 110 and the stator 310 will hereinafter be described in detail.

The rotor 110 may be inserted into a hollow to be formed in the center part of the stator 310, and a gap may be formed between the outer circumference of the rotor 110 and the inner circumference of the stator 310 (i.e., the inner circumference of the teeth).

In addition, the angle (θ2) of the sections (P3~P7) in which the outer circumference of the rotor 110 has a first curvature radius R1 is larger than the angle (θ1) between both ends (P4~P6) of the teeth protrusion 312b of the stator 310. In addition, the angle (θ2) of the sections (P3~P7) in which the outer circumference of the rotor 110 has the first curvature radius R1 may be less than the angle (θ3) between both ends (P2~P8) of the teeth shoe 312a of the stator 310.

The construction and shapes of the motor 100 according to an embodiment will hereinafter be described in detail.

Compared to the conventional motor, noise and vibration of the motor 100 according to an embodiment will hereinafter be described in detail.

The noise and vibration of the motor may be estimated in various ways.

In accordance with embodiments of the disclosure, the noise and vibration of the motor may be estimated using back electromotive force and normal force, for example.

Figure 29:
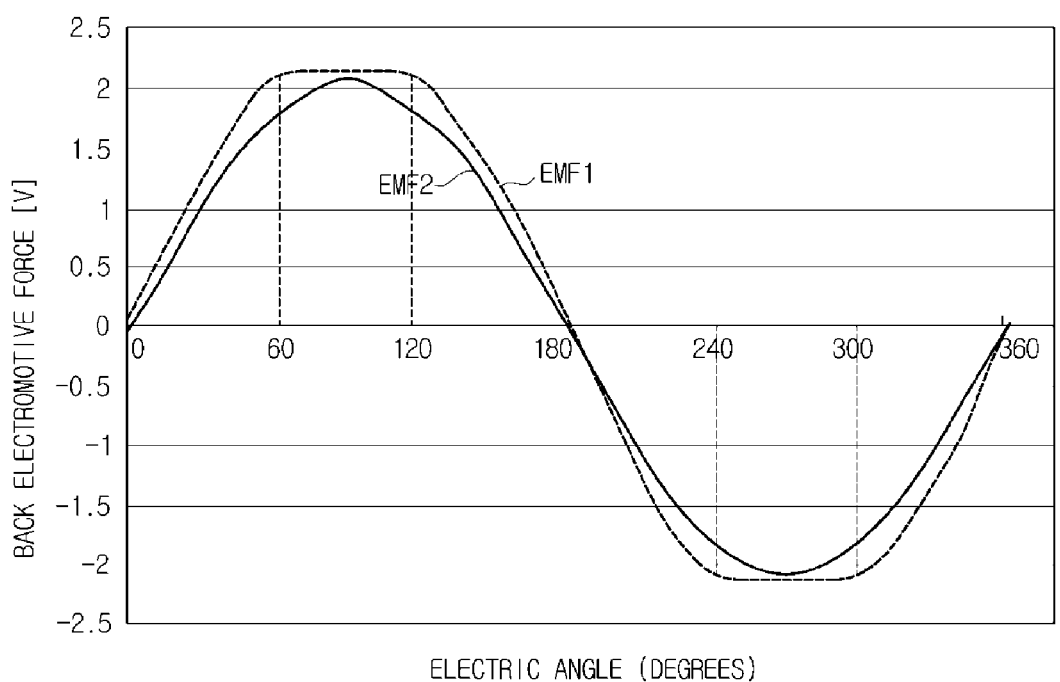
FIG. 29 shows back electromotive force of the conventional motor and back electromotive force of the motor of the embodiment.

FIG. 29 shows back electromotive force of the conventional motor and back electromotive force of the motor according to one or more of the disclosed embodiments.

The back electromotive force of the conventional motor and the back electromotive force of the motor according to one or more of the disclosed embodiments will hereinafter be described with reference to FIG. 29.

The position of the rotor facing the end of the stator may be changed during rotation of the rotor, so that the strength and direction of a magnetic field inter-linked to the coil wound along the outer surface of the stator are changed in response to rotation of the rotor during rotation of the motor rotor.

Since the strength and direction of the magnetic field interlinked to the coil is changed, back electromotive force occurs in the coil according to the electromagnetic induction law.

If back electromotive force occurs in the form of sinusoidal waves during rotation of the rotor, the noise and vibration of the motor may be minimized.

However, the back electromotive force (EMF1) of the conventional motor (including a circular rotor and a stator having no teeth protrusion) may occur in the form of a trapezoid as shown in FIG. 29.

The occurrence of trapezoidal back electromotive force (EMF1) may indicate that large vibration occurs by rotation of the rotor so that large noise is generated from the motor.

In contrast, the back electromotive force (EMF2) of the motor 100 according to one or more of the disclosed embodiments may be similar to sinusoidal waves.

The occurrence of the sinusoidal back electromotive force (EMF2) may indicate the vibration caused by the rotor rotation is not high so that noise from the motor may be minimized.

Figure 30:
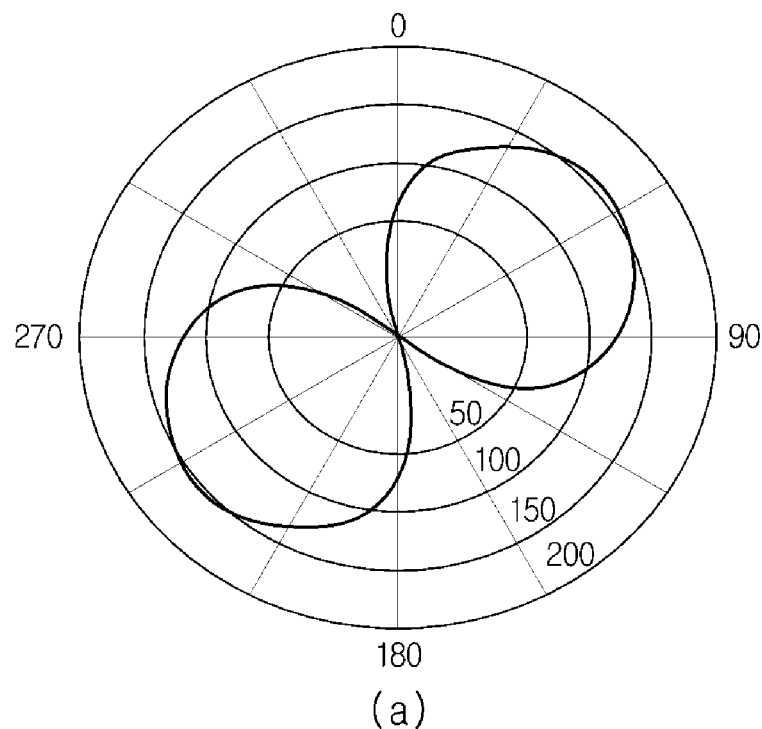
FIG. 30 shows nodal force applied to the stator of the motor according to an exemplary embodiment.
Figure 30:
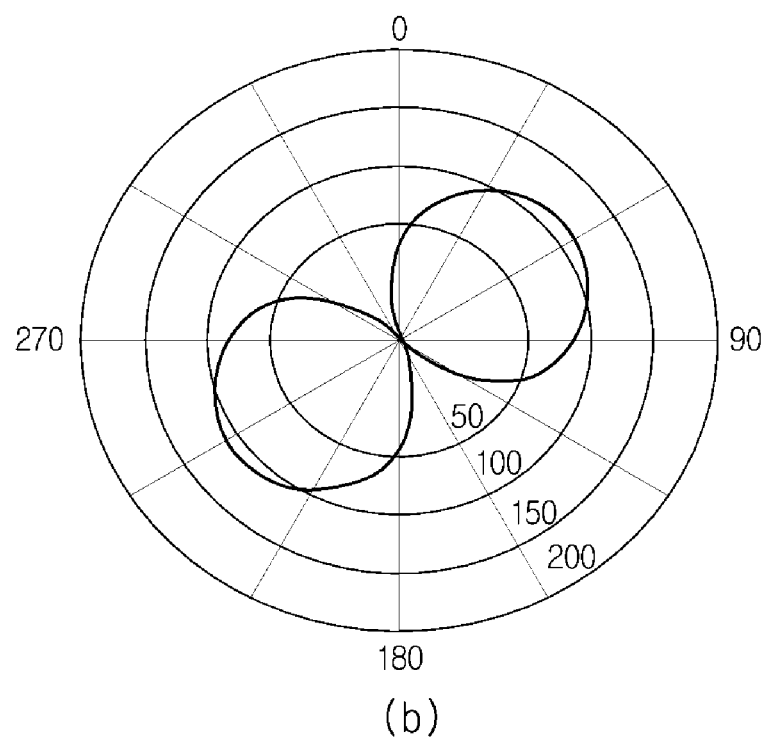

FIG. 30 shows nodal force applied to the stator of the motor according to an exemplary embodiment.

Nodal force may indicate a force or power applied to a nodal point during simulation for interpreting vibration of the motor.

The nodal force shown in FIG. 30 may be applied to the end of the teeth contained in the stator.

If there is a large deviation between nodal forces applied to the end of the teeth contained in the stator by rotation of the rotor, vibration occurs in the stator, the entire motor vibrates by such vibration of the stator, and noise also occurs.

Referring to FIG. 30(a), according to the conventional motor (including a circular rotor and a stator having no teeth protrusion), a maximum nodal force caused by the rotor rotation is set to 164.19 N, and a minimum nodal force is set to 0.01 N. In addition, deviation of the nodal force based on the rotor rotation is denoted by 164.19 N.

Referring to FIG. 30(b), the motor 100 according to one or more of the disclosed embodiments has a maximum nodal force caused by the rotor rotation set to 130.43 N, and a minimum nodal force set to 0.13 N. In addition, deviation of the nodal force based on the rotor rotation is denoted by 130.30 N.

In comparison between FIG. 30(a) and FIG. 30(b), deviation of the nodal force of the motor 100 according to one or more of the disclosed embodiments is reduced by about 20% as compared to deviation of the nodal force of the conventional motor.

Deviation reduction of the nodal force of the motor 100 according to one or more of the disclosed embodiments may also reduce the vibration and noise of the motor 100.

As is apparent from the above description, the rolling piston according to one or more of the disclosed embodiments eccentrically rotates about the rotation axis, so that refrigerant contained in the compression chamber may be compressed.

In accordance with one or more embodiments of the disclosure, since the busbar assembly configured to interconnect windings of coils having the same phase is used, product reliability may be improved.

In accordance with one or more embodiments of the disclosure, several busbars connected to coils having different phases are arranged at different concentric circles, and miniaturization of the busbar assembly may be achieved.

Although example embodiments of the disclosure have been shown and described, it would be appreciated by those skilled in the art that changes may be made to these embodiments without departing from the disclosure, the scope of which is defined in the claims and their equivalents.

What is claimed is:

1. A motor, comprising:
   a stator assembly including a stator in which a hollow is formed, a plurality of coils formed by a winding wound on the stator, and an insulator to insulate the stator from the coils; and
   a rotor inserted into the hollow, to rotate about a rotation axis,
   wherein
      the rotor includes a plurality of poles, and
      a curvature radius of an outer circumference of a center part of the poles is different from a curvature radius of an outer circumference of an edge part of the poles, and
   wherein the stator includes:
      a ring-shaped stator body; and
      teeth protruded from the stator body in a radial direction,
   wherein the teeth include:
      a teeth shoe protruded from the teeth in a circumferential direction, and
      a teeth protrusion radially protruded from the teeth.

2. The motor according to claim 1, wherein:
   the poles of the rotor are divided into a first region and a second region along a circumferential direction of the rotor, and
   a curvature radius of an outer circumference of the first region is larger than that of an outer circumference of the second region.

3. The motor according to claim 1, wherein an angle between both ends of the first region on the basis of the rotation axis is less than an angle between both ends of the teeth shoe on the basis of the rotation axis.

4. The motor according to claim 1, wherein an angle between both ends of the first region on the basis of the rotation axis is larger than an angle between both ends of the teeth protrusion on the basis of the rotation axis.

5. The motor according to claim 1, further comprising:
   a busbar assembly to connect the plurality of coils,
   wherein the busbar assembly includes:
      a plurality of busbars having circular arc shapes having different radiuses, and
      a busbar housing to insulate the plurality of busbars.

6. The motor according to claim 5, wherein the plurality of busbars includes:
   a busbar extending unit to extend the plurality of busbars to an innermost or outermost part of the busbar housing; and
   a winding coupling unit provided at an end of the busbar extending unit, to be coupled to the winding.

7. The motor according to claim 6, wherein the winding coupling unit includes a folded plate in which a coupling protrusion part is formed at a central part thereof.

8. The motor according to claim 6, wherein the winding coupling unit includes:
   a winding stripper to electrically contact the winding;
   a stripper support body to support the winding stripper; and
   a winding fixing member to fix the winding to the winding stripper.

9. The motor according to claim 6, wherein the busbar housing insulates between the plurality of busbars, and includes a plurality of ring-shaped barriers having different radiuses.

10. The motor according to claim 6, wherein: the busbar housing includes a stator hook through which the busbar housing is fixed to the stator assembly; and the insulator includes a hook engaging part that is provided at a position corresponding to the stator hook and is coupled to the stator hook.

11. The motor according to claim 6, wherein:
   the insulator includes a winding guide bar to bend the plurality of windings; and
   the busbar housing includes a winding guide groove to bend the plurality of windings.

12. The motor according to claim 6, wherein the busbar assembly further includes a busbar housing cover to cover an upper part of the busbar housing.

13. The motor according to claim 12, wherein:
   the busbar housing includes a cover hook to fix the busbar housing cover to a coupling position and a cover guide bar to direct the busbar housing cover to a coupling position; and
   the busbar housing cover has a cover guide groove located at a position corresponding to the cover guide bar.

* * * * *